United States Patent
Hoshino et al.

(10) Patent No.: US 6,804,300 B1
(45) Date of Patent: Oct. 12, 2004

(54) TELEVISION AUDIOVISUAL, RECORDING AND REPRODUCING APPARATUS USING PERSONAL COMPUTER, METHOD OF SUPPLYING POWER TO PC CARD, AND PC CARD

(75) Inventors: Kiyoshi Hoshino, Ome (JP); Tatsuji Kusumoto, Fussa (JP); Tadahiro Oku, Kawasaki (JP); Osamu Kaseno, Yokohama (JP); Hiroyuki Kamio, Kunitachi (JP); Kanji Inoue, Hanno (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 648 days.

(21) Appl. No.: 09/660,190

(22) Filed: Sep. 12, 2000

(30) Foreign Application Priority Data

Dec. 27, 1999 (JP) .............................................. 11-371565

(51) Int. Cl.[7] ................................................ H04N 7/12
(52) U.S. Cl. ................................. 375/240.1; 375/240.1
(58) Field of Search ....................... 375/240.1; 348/231, 348/232, 233, 722, 552, 515; 710/2, 52, 72, 73; H04N 7/12

(56) References Cited

U.S. PATENT DOCUMENTS

| | | | | | |
|---|---|---|---|---|---|
| 5,805,796 | A | * | 9/1998 | Finch et al. | 714/40 |
| 5,815,201 | A | * | 9/1998 | Hashimoto et al. | 348/231.4 |
| 5,815,205 | A | * | 9/1998 | Hashimoto et al. | 348/373 |
| 5,907,686 | A | | 5/1999 | Zenda | |
| 6,041,374 | A | * | 3/2000 | Postman et al. | 710/73 |
| RE37,342 | E | * | 8/2001 | Washino et al. | 348/722 |
| 6,389,149 | B1 | * | 5/2002 | Liu | 382/100 |

* cited by examiner

*Primary Examiner*—Nhon Diep
(74) *Attorney, Agent, or Firm*—Finnegan, Henderson, Farabow, Garrett & Dunner, L.L.P.

(57) ABSTRACT

A television audiovisual apparatus using a personal computer comprises an audio/video I/O interface including a television tuner, disposed in the personal computer, and an information compression/decompression unit for compressing audio/video signals input through the audio/video I/O interface in accordance with the MPEG2 specifications to store the compressed audio/video signals in a large capacity storage disposed in the personal computer, and for decompressing compressed audio/video signals in accordance with the MPEG2 specifications.

12 Claims, 24 Drawing Sheets

FIG. 9

NEW RESERVE — 121

- CHANNEL: ○○TELEVISION
- RECORDING START DATE: ● 1999/06/18  ○ EVERY DAY
- RECORDING START TIME: 22:00
- RECORDING END DATE: 1999/06/18
- RECORDING END TIME: ● 23:20  ○ RECORDING DURATION 01:20
- IMAGE QUALITY MODE: HIGH QUALITY
- TITLE NAME: NEWS PROGRAM
- CATEGORY: NEWS DOCUMENTARY
- PROGRAM MEMO: ▽TODAY NEWS▽TODAYSPORTS・BASEBALL, SOCCER INFORMATION ETC. ▽TODAY'S SPECIAL▽WEATHER FORECAST FOR TOMORROW

[CANCEL] 122    [SET RESERVE] 123

FIG. 10

[SETTING PARAMETER FOR RECORDING RESERVE]

| ITEM | PARAMETER |
|---|---|
| RESERVE NUMBER | (1-N) |
| DATE | EVERYDAY/MONDAY/TUESDAY/WEDNESDAY/THURSDAY/FRIDAY/SATURDAY/MONDAY・FRIDAY/MONDAY・SATURDAY |
| | DATE(YYYY:MM:DD) |
| RECORDING STARTING TIME | HOURS:MINUTES(HH:MM) |
| RECORDING END TIME | HOURS:MINUTES(HH:MM) |
| INPUT SOURCE | CHANNEL NUMBER/EXTERNAL INPUT 1 |
| RECORDING MODE | HIGH QUALITY MODE(MPEG2/6Mbps) STANDARD MODE(MPEG2/4Mbps) LONG TIME MODE(MPEG2/2Mbps) |
| TITLE NAME | TITLE NAME OF PROGRAM(ARBITRARY STRING) |
| PROGRAM CATEGORY | MOVIES/SPORTS/MUSIC/ENTERTAINMENT/NEWS・DOCUMENTARY/HOBBY, PRACTICE/LIFE, LOCAL INFORMATION/EDUCATION CERTIFICATES |
| PROGRAM MEMO | MEMO ON PROGRAM(ARBITRARY STRING) |

```
Date=19990529         ;DATE(yyy/mm/dd)
StartTime=21:00       ;START TIME(hh:mm)
EndTime=21:30         ;END TIME(hh:mm)
Channel=1             ;CHANNEL(1-n)
Title=○○news         ;TITLE OF PROGRAM
Category=News         ;CATEGORY OF PROGRAM
MovieFile=file1.mpg   ;VIDEO FILE NAME
```

|  | file1.pty | file2.pty | file3.pty |
|---|---|---|---|
| Date | 1999093 | 1999093 | 1999094 |
| StartTime | 21:00 | 23:00 | 19:00 |
| EndTime | 21:30 | 24:00 | 19:54 |
| Channel | 1 | 4 | 8 |
| Title | NEWS PROGRAM | ENGLISH CONVERSATION LESSON | |
| Category | NEWS | CULTUREe | VARIETY |
| MovieFile | File1.mpg | File2.mpg | File3.mpg |

FIG. 16

| SUN 8/29 | MON 8/3 | TUE 8/31 | WED 9/1 | THUR 9/2 | FRI 9/3 | SAT 9/4 |
|---|---|---|---|---|---|---|
| | | | | | FILE1 | FILE3 |
| | | | | | FILE2 | |

RECORDED FILE LIST

FIG. 17

|  | 1ch | 3ch | 4ch | 6ch | 8ch | 12ch |
|---|---|---|---|---|---|---|
| 19 O'CLOCK | | | | | | |
| 20 O'CLOCK | | | | | | |
| 21 O'CLOCK | FILE1 | | | | | |
| 22 O'CLOCK | | | | | | |
| 23 O'CLOCK | | | | FILE2 | | |
| 24 O'CLOCK | | | | | | |

RECORDED FILE ICON

FIG. 18

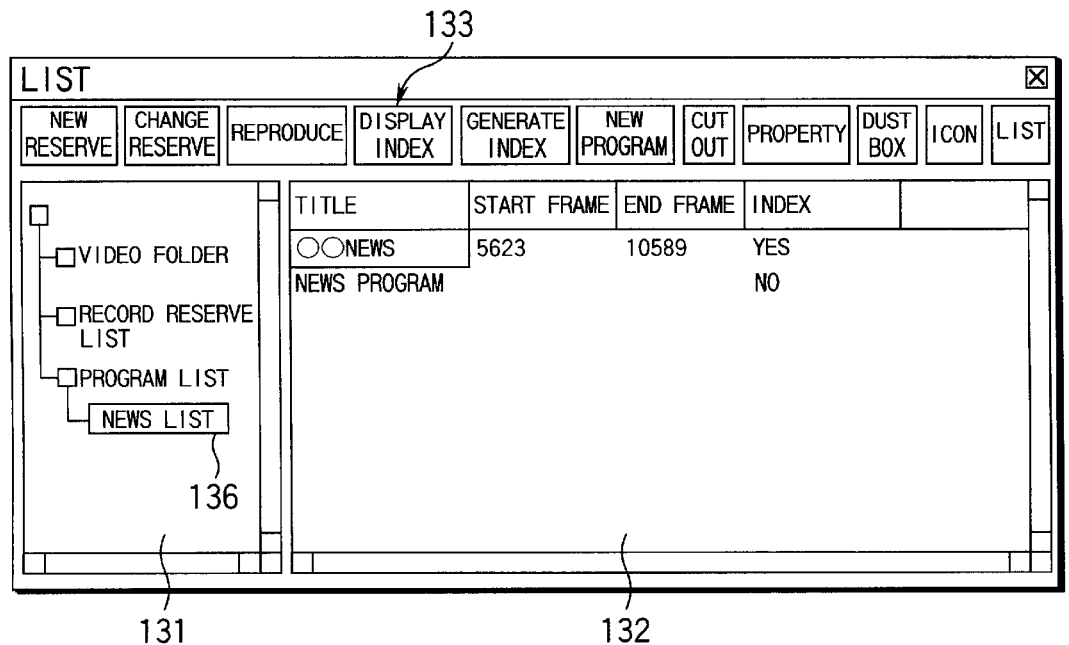
FIG. 29
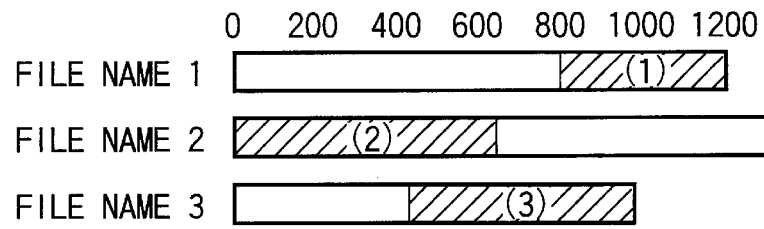
FIG. 30A
FIG. 30B

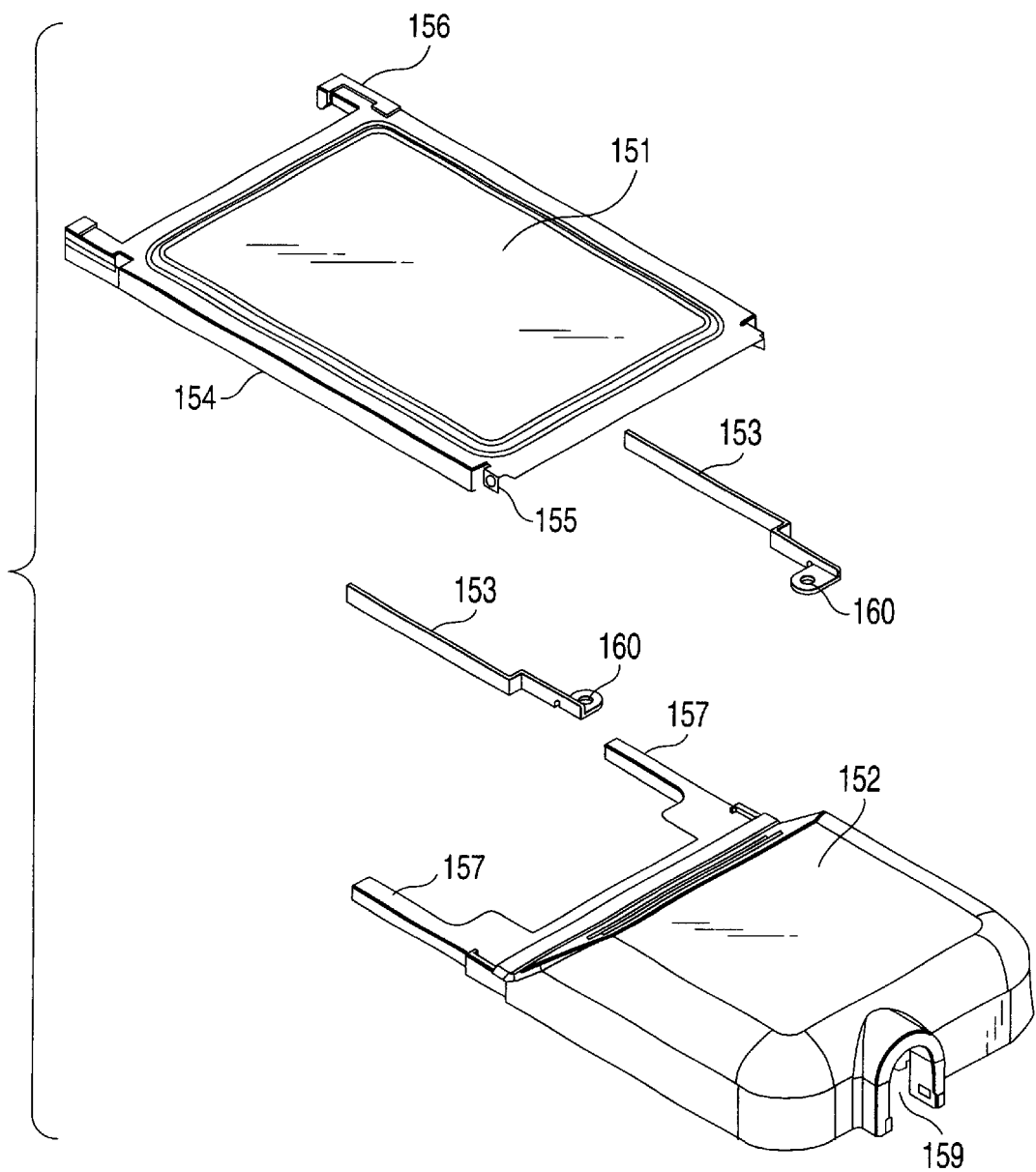
F I G. 34

TELEVISION AUDIOVISUAL, RECORDING AND REPRODUCING APPARATUS USING PERSONAL COMPUTER, METHOD OF SUPPLYING POWER TO PC CARD, AND PC CARD

CROSS-REFERENCE TO RELATED APPLICATIONS

This application is based upon and claims the benefit of priority from the prior Japanese Patent Application No. 11-371565 filed Dec. 27, 1999, the entire contents of which are incorporated herein by reference.

BACKGROUND OF THE INVENTION

The present invention relates to a television audiovisual, recording and reproducing apparatus using a personal computer, a method of supplying power to a PCMCIA card, and a PCMCIA card.

Recently, there have been devised some personal computers which are also provided with a function of receiving television broadcasting to enable to record and reproduce television programs. This function is implemented by a desk top type personal computer which is previously equipped with a board having functions of receiving, recording and reproducing television broadcast programs. For note type personal computers, however, this function has not been brought into practical use.

A note type personal computer generally has a PCMCIA slot as an expansion slot in which a PCMCIA card can be inserted to provide a variety of extended functions. The PCMCIA cards have been standardized in conformity to Japanese Electronic Industry Development Association (JEIDA) and Personal Computer Memory Card International Association (PCMCIA) as PCMCIA card standard. The standardization defines the capacity of power supplied from a personal computer to a PCMCIA card; a procedure for detecting a PCMCIA card when it is inserted into a personal computer; a power supply sequence; and the like. The standards, though defining a maximum capacity for power supplied to a PCMCIA card, does not contemplate any method of supplying power exceeding this maximum capacity.

Also, conventional PCMCIA cards include a PCMCIA card which is a version of PCMCIA Type II PCMCIA card additionally provided with an expansion unit. The conventional extended type PCMCIA card is integrally formed in a case, including a Type II card unit and the expansion unit. Since the extended type PCMCIA cards are designed in different sizes in accordance with their respective functions, their cases must be manufactured to fit for the respective sizes.

As mentioned above, a desk top personal computer equipped with the television broadcasting receiving, recording and reproducing functions is configured to achieve the object by previously mounting a board which provides predetermined functions, so that it is difficult to add the television broadcasting receiving, recording and reproducing function to a currently possessed personal computer at a later time. Particularly, for a small personal computer such as a note type personal computer which does not have a space for adding a board, it is impossible to add the television broadcasting receiving, recording and reproducing functions at a later time.

In the standardization for the PCMCIA cards for use in the note type personal computer, while the standards define the maximum capacity for a power supply to a PCMCIA card, they do not contemplate at all a method of supplying power exceeding this maximum capacity, as mentioned above. When the power supply capacity of a PCMCIA card exceeds the maximum capacity defined by the standards, an external power source must be used to supply the PCMCIA card with additional power. However, the PCMCIA card and an interface IC in a personal computer, which accepts the PCMCIA card, can be damaged unless the power supply from the personal computer is compatible with a power supply condition from the external power source.

Also, the extended type PCMCIA card, which is a version of the PCMCIA Type II PCMCIA card provided with an expansion unit, is integrally formed in a case, including the Type II card unit and the expansion unit. While the extended type PCMCIA cards are designed in different sizes in accordance with their respective functions, the cases integrally formed as before cannot be shared by all extended type PCMCIA cards, so that the entire cases must be newly manufactured, thereby resulting in a problem of an increased cost.

BRIEF SUMMARY OF THE INVENTION

It is an object of the present invention to provide a television audiovisual, recording and reproducing apparatus using a note type personal computer, which is capable of readily accepting television broadcasting receiving, recording and reproducing functions at a later time.

It is another object of the present invention to provide a PCMCIA card power supply method for use with a PCMCIA card which requires a power capacity exceeding a maximum capacity of a power supply from a personal computer to the PCMCIA card, which is capable of supplying the PCMCIA card with power external to the personal computer in a procedure which is compatible with a procedure of detecting an inserted PCMCIA card and a power supply sequence, performed when the PCMCIA card is inserted into the personal computer, as defined by the standards.

It is a further object of the present invention to provide an extended type PCMCIA card, comprised of a PCMCIA Type II PCMCIA card and an expansion unit attached thereto, which is capable of sharing a case for a portion corresponding to the PCMCIA Type II, even with a different size, to reduce the cost.

A television audiovisual apparatus using a personal computer according to a first aspect of the present invention comprises an audio/video I/O interface including a television tuner in the personal computer, wherein audio/video signal input through the audio/video I/O interface are compressed in accordance with the MPEG2 specifications for storage in a large capacity storage device, or decompressed in accordance with the MPGE2 specifications for display.

The foregoing configuration allows a television receiving function to be added even to a note type personal computer, allowing the user to view a television program.

A television audiovisual apparatus using a personal computer according to a second aspect of the present invention comprises an audio/video I/O interface including a television tuner, and a PCMCIA card inserted in an expansion slot provided in the personal computer, wherein audio/video signals are compressed in accordance with the MPEG2 specifications in the audio/video I/O interface or in the PCMCIA card and transmitted to the personal computer for storage in a large capacity storage device of the personal computer, or decompressed in accordance with the MPEG2 specifications in the personal computer for display.

By connecting the audio/video I/O interface to the personal computer through the PCMCIA card to receive television broadcasting with the audio/video I/O interface and transmit the received television broadcasting to the personal computer through the PCMCIA card, a television receiving function can be added even to a note type personal computer at a later time, allowing the user to readily view a television program.

A television audiovisual apparatus using a personal computer according to a third aspect of the present invention comprises an audio/video I/O interface including a television tuner, and a PCMCIA card inserted into an expansion slot provided in the personal computer, wherein audio/video signals are transmitted from the audio/video I/O interface to the personal computer through the PCMCIA card, and compressed in accordance with the MPEG specifications in the personal computer for storage in a large capacity storage device.

When the television broadcasting is received by the audio/video I/O interface, transmitted to the personal computer through the PCMCIA card, and compressed in the personal computer for storage in the large capacity storage device as described above, the television receiving function can also be added to a note type personal computer so that the user can readily view a television program.

A television audiovisual apparatus using a personal computer according to a fourth aspect of the present invention comprises an audio/video I/O interface including a television tuner coupled to the personal computer through a bus connector, wherein an audio/video signals are compressed in accordance with the MPEG2 specifications in the audio/video I/O interface and transmitted to the personal computer for storage in a large capacity storage device of the personal computer, or are decompressed in accordance with the MPEG2 specifications in the personal computer for display.

By connecting the audio/video I/O interface to the personal computer through the bus connector as described above, the audio/video I/O interface can be reliably connected to the personal computer, so that data can be transferred at a high speed.

A television audiovisual apparatus using a personal computer according to a fifth aspect of the present invention comprises an audio/video I/O interface including a television tuner coupled to a personal computer through a radio communication unit, wherein audio/video signals are compressed in accordance with the MPEG2 specifications in the audio/video I/O interface, and transmitted to the personal computer for storage in a large capacity storage device of the personal computer, or are decompressed in accordance with the MPEG2 specifications in the personal computer for display.

By coupling the audio/video I/O interface to the personal computer through the radio communication unit as described above, the audio/video I/O interface can be readily coupled to the personal computer.

A television audiovisual, recording and reproducing apparatus using a personal computer according to a sixth aspect of the present invention comprises a personal computer including an expansion slot, an audio/video I/O interface including a television tuner, a PCMCIA card inserted into the expansion slot of the personal computer, wherein audio/video signals are compressed in accordance with the MPEG2 specifications in the audio/video I/O interface or in the PCMCIA card, and a transmission unit for transmitting the compressed audio/video signals to the personal computer, wherein the personal computer is operable in an audiovisual mode to multiplex a compressed video signal and a non-compressed audio signal sent from the PCMCIA card with the timing of the two signals being matched, demultiplex the two signals and output the demultiplexed signals to a display device and a speaker, respectively, and the personal computer is further operable in a recording mode to compress an audio signal sent from the PCMCIA card, multiplex the compressed audio signal on the compressed video signal with the timing of the two signals being matched, and record the multiplexed signal in a large capacity recording medium.

As described above, since the audio/video I/O interface is connected to the personal computer through the PCMCIA card, such that in the television audiovisual mode, a compressed video signal and a non-compressed audio signal sent from the PCMCIA card are multiplexed, and transmitted to the personal computer, the timing of the video signal and the audio signal can be matched. Also, since the audio signal is transmitted from the PCMCIA card to the personal computer without compression, the personal computer need not decompress the audio signal, so that a television program can be efficiently received in a simple configuration.

A recording and reproducing apparatus using a personal computer according to a seventh aspect of the present invention comprises a personal computer including an expansion slot, and a PCMCIA card inserted into the expansion slot of the personal computer for transmitting externally input video signal and audio signal to the personal computer, wherein the personal computer includes a recording/reproducing unit which records and reproduces a signal input thereto through the PCMCIA card in and from a large capacity storage medium, a PCMCIA card detector which detects a mounting state of the PCMCIA card in the expansion slot, a recording reserve setting unit which sets a recording reserve, and a reset unit which displays a warning or canceling a recording reserve in response to the PCMCIA card detector detecting that the PCMCIA card has come off when the recording reserve has been set.

According to the foregoing configuration, when a recording reserve is set, an insertion state of the PCMCIA card in the expansion slot is checked to display a warning, for example, "Card has come off. Please insert properly." or the like, or the recording reserve is canceled if it is detected that the PCMCIA card has come off. Therefore, the user can confirm that the card is not properly inserted in the expansion slot through the warning or the canceled recording reserve, and can subsequently make a recording reserve after the card is properly inserted.

A recording and reproducing apparatus using a personal computer according to an eighth aspect of the present invention comprises a personal computer including an expansion slot, and a PCMCIA card inserted into the expansion slot of the personal computer for transmitting an external input video signal and audio signal to the personal computer, wherein the personal computer includes a recording/reproducing unit which records and reproduces a signal input thereto through the PCMCIA card in and from a large capacity storage medium, a PCMCIA card detector which detects a mounting state of the PCMCIA card in the expansion slot, a recording reserve setting unit which sets a recording reserve, and a reset unit which checks whether or not the PCMCIA card is normally mounted by the PCMCIA card detector before executing the reserved recording set by the recording reserve setting unit to display a warning and cancel the recording reserve when abnormal mounting of the PCMCIA card is detected.

According to the foregoing configuration, when a recording reserve is set, an insertion state of the PCMCIA card in the expansion slot is checked immediately before the recording reserve is performed to display a warning and cancel the recording reserve if it is detected that the PCMCIA card has come off. Therefore, if a failure occurs for some reason such as the PCMCIA card coming off or the like after a recording reserve was correctly made, a warning is displayed so that the user can confirm the occurrence of a failure such as the PCMCIA card coming off or the like, and subsequently remove the cause of the failure and perform manipulations for making a recording reserve, starting the recording, or the like.

A recording and reproducing apparatus using a personal computer according to a ninth aspect of the present invention comprises a property information storage which collects property information inherent to recording and storing the property information in a memory during the recording, a recording unit which records the property information as a property file linked to an video file in a large capacity storage device when the recording is terminated, and a recorded video file list display unit responsive to a request for displaying a list of recorded video files for classifying the video files based on the property information to produce a recording file list and display the recording file list on a display device.

According to the configuration described above, when the user instructs the recording and reproducing apparatus to display a list of recorded video files, a recorded video file list is generated from the property information recorded as linked to the video file and displayed on the screen. Therefore, the user can readily and rapidly find a target video file from the recorded video file list displayed on the screen and reproduce the target video file.

In the recording and reproducing apparatus using a personal computer in the seventh aspect of the present invention, the recorded video file list display unit selectively displays a day-based recorded video file list or a week-based recorded video file list as the recorded video file list. This configuration allows the user to designate the day-based recorded video file list or the week-based recorded video file list for display, and to more rapidly find a target video file.

The recording and reproducing apparatus using a personal computer in the ninth aspect of the present invention, further comprises a file name setting unit which sets a file name for a recorded video file based on the property information stored in the property information storage when recording is terminated, and a property priority setting unit which previously sets priority to the property information referenced by the file name setting unit. Since this configuration allows the user to previously set the priority to the property information referenced by the file name setting unit, the file names of video files can be made readily understandable for the user.

A recording and reproducing apparatus using a personal computer according to a tenth aspect of the present invention comprises a recording reserve setting unit which sets a recording reserve, a recording reserve folder which preserves reserve setting information set by the recording reserve setting unit, a recording unit which performs recording based on the reserve setting information set in the recording reserve setting unit, a recording complete detector which detects the completion of recording performed by the recording unit, and a transfer section which transfers the reserve setting information preserved in the recording reserve folder to a recording end folder when the recording complete detector detects the completion of recording.

According to the foregoing configuration, when recording is performed based on a recording reserve, reserve setting information preserved in the recording reserve folder is automatically transferred to the recording end folder after the completion of the recording, so that the user can confirm without fail the reserve setting information before the recording and the setting information after the recording without making any mistake.

A recording and reproducing apparatus using a personal computer according to an eleventh aspect of the present invention comprises an index thumb nail generator which analyzes an video file to extract picture switching as indexes, a thumb nail display which displays index thumb nails generated by the index thumb nail generator as a list on a screen, a reproducing range designator which arbitrarily selects the index thumb nails displayed as a list by the thumb nail display to select a reproduction start frame and an end frame, a list file generator which combines one or a plurality of video files to designate a reproducing range by the reproducing range designator to generate a list file, and a reproduction unit which reproduces the range designated in accordance with the list file generated by the list file generator.

According to the foregoing configuration, by arbitrarily selecting index thumb nails displayed in the form of list on the screen to designate a range, it is possible to readily generate a program list file for a plurality of video files and to reproduce desired scenes in succession.

A twelfth aspect of the present invention provides a PCMCIA card power supply apparatus which supplies a PCMCIA card inserted in an expansion slot of a personal computer with power from an external power source other than power supplied from the personal computer. The PCMCIA card power supply apparatus comprises a PCMCIA card insertion detector which detects insertion of a PCMCIA card when the PCMCIA card inserted in the expansion slot is in an external power supply enabled state, a first power supply unit which starts power supply from the personal computer to the PCMCIA card in response to a PCMCIA card insertion detecting signal detected by the PCMCIA card insertion detector, a power supply detector which detects on the PCMCIA card that the PCMCIA card is supplied with the power from the first power supply unit, and a second power supply unit which supplies the PCMCIA card with external power in response to a power supply detecting signal from the power supply detector.

According to the foregoing configuration, when the PCMCIA card is inserted into the expansion slot of the personal computer, the insertion of the PCMCIA card is detected provided that the external power source can be supplied to the PCMCIA card, causing the personal computer to supply the power to the PCMCIA card. As the PCMCIA card is supplied with the power from the personal computer, this state is detected to supply the PCMCIA card with the power from the external power source. As a result, the power supply from the personal computer to the PCMCIA card can be matched with the power supply from the external power source to the PCMCIA card, thereby making it possible to prevent useless power supply to the PCMCIA card and damages on the PCMCIA card.

In the PCMCIA card power supply apparatus according to the twelfth aspect of the present invention, the PCMCIA card insertion detector notifies the personal computer that the PCMCIA card is inserted when the external power source for the PCMCIA card inserted in the expansion slot is in a power supply enabled state, and notifies the personal computer that the PCMCIA card is not inserted when the external power source is in a power supply disabled state.

According to the foregoing configuration, when the PCMCIA card is inserted into the expansion slot, the PCMCIA card insertion detector notifies the personal computer that the PCMCIA card is inserted when the external power source for the PCMCIA card inserted in the expansion slot is in the power supply enabled state, and notifies the personal computer that the PCMCIA card is not inserted when the external power source is in the power supply disabled state, so that the PCMCIA card is not supplied with the power from the personal computer unless the external power source is in the power supply enabled state, even if the PCMCIA card is inserted in the slot card. Therefore, the personal computer can reliably control the power supply to the PCMCIA card in accordance with the supply enabled state of the external power source.

In the PCMCIA card power supply apparatus according to the twelfth aspect of the present invention, the second power supply unit stops supplying the PCMCIA card with the external power when the power supply detector detects that the power supply from the personal computer to the PCMCIA card is stopped.

With the foregoing configuration, when the personal computer stops supplying the power to the PCMCIA card, the PCMCIA card detects the stopped power supply to automatically stop the power supplied from the external power source. Therefore, even when the power from the personal computer is turned off, the power supply from the personal computer to the PCMCIA card can be matched with the power supply to the PCMCIA card from the external power source.

In the PCMCIA card power supply apparatus according to the twelfth aspect of the present invention, the PCMCIA card insertion detector notifies the personal computer that the PCMCIA card is drawn out from the expansion slot of the personal computer when the external power cannot be supplied to the PCMCIA card while the PCMCIA card remains inserted in the expansion slot of the personal computer, when the PCMCIA card is being supplied with the power from the external power source and the personal computer.

With the foregoing configuration, even if the external power source is turned off with the PCMCIA card left inserted in the expansion slot of the personal computer, the personal computer can detect this state to turn off the power supplied from the personal computer to the PCMCIA card, thereby resulting in the matching of the power supplies.

In the PCMCIA card power supply apparatus, the PCMCIA card opens a card insertion detecting signal for use in detecting insertion of a card in accordance with the PCMCIA card standard in an external power supply disabled state.

By opening the card insertion detecting signal in the external power supply disabled state as described above, the personal computer can detect the power supplied to the PCMCIA card from the external power source to reliably control the power supply.

A thirteenth aspect of the present invention provides an extended type PCMCIA card extended from a PCMCIA Type II card. This PCMCIA card comprises a front panel corresponding to the Type II card, and an extension case for a card expansion unit provided in separation, wherein the front panel is coupled with the extension case, and brackets made of a metal reinforce a coupling between the front panel and the extension case.

With the foregoing structure, even for a variety of PCMCIA cards having expansion units of different sizes, only the extension cases need be newly manufactured, since the front panel for the Type II card unit can be used in common. It is therefore possible to readily support a variety of PCMCIA cards having different sizes, and fabricate the PCMCIA card at a lower cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a diagram illustrating an example of a screen display on a new reserve window in the embodiment;

FIG. 10 is a table showing setting parameters for a recording reserve in the embodiment;

FIG. 16 is a diagram showing an example of a property table which is created when a list of recording files is displayed in the embodiment;

FIG. 17 is a diagram showing an example of a recording file list when it is displayed as a week-based file list in the embodiment;

FIG. 18 is a diagram showing an example of a recording file list when it is displayed as a day-based file list in the embodiment;

FIG. 29 is a diagram illustrating that a file name, a start frame and an end frame are added to a program window list during the creation of the program list file in the embodiment;

FIGS. 30A and 30B are diagrams showing the file names of selected files, and how start frame numbers and end frame numbers are set in the creation of the program list file in the embodiment;

FIG. 34 is an exploded perspective view of a Type II unit and a case for an expansion unit of the PCMCIA card in the embodiment.

DETAILED DESCRIPTION OF THE INVENTION

The present invention will hereinafter be described in connection with several embodiments thereof with reference to the accompanying drawings.

Figure 1:
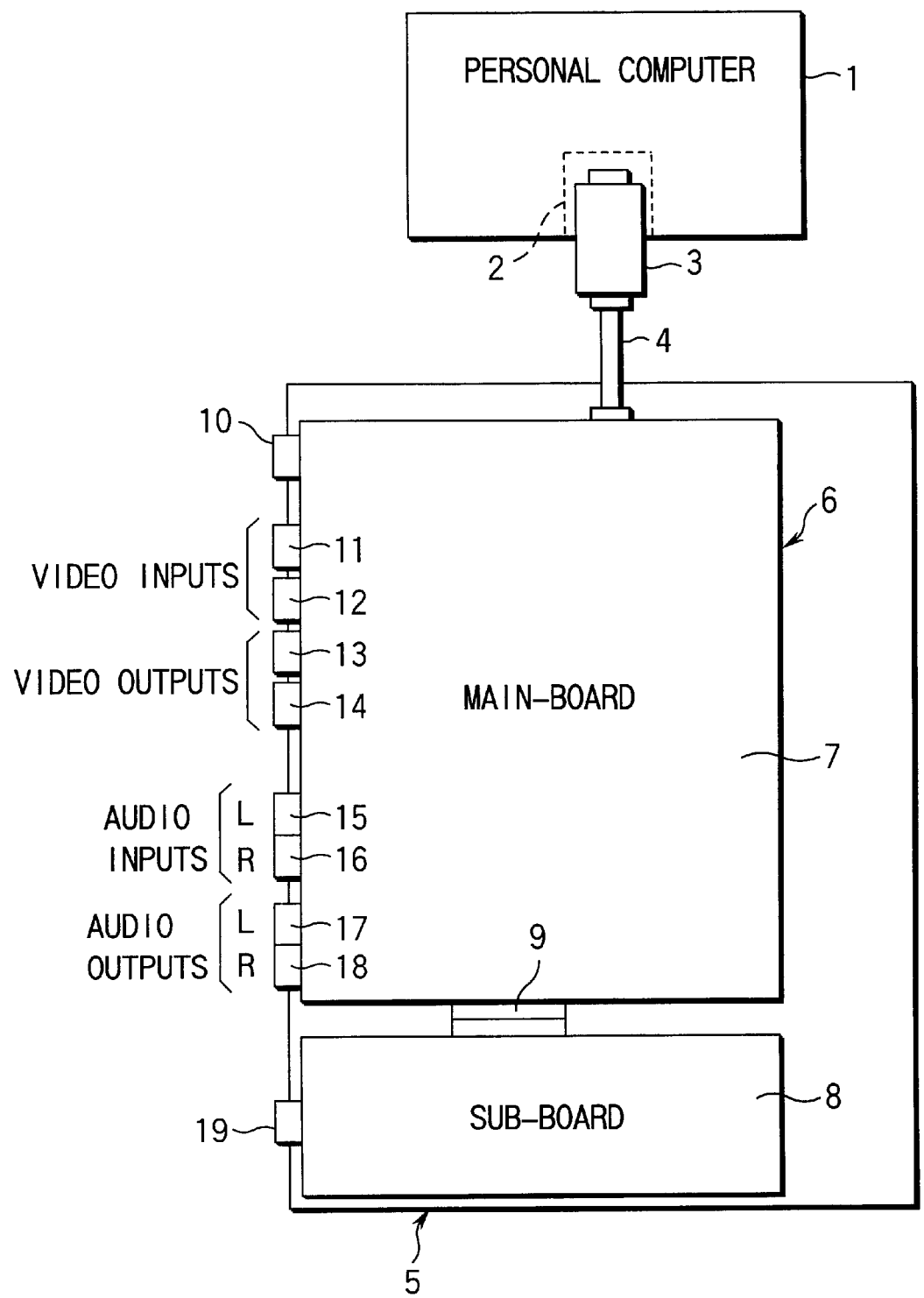
FIG. 1 is a schematic diagram generally illustrating the configuration of a television audiovisual, recording and reproducing apparatus using a personal computer according to one embodiment of the present invention.

FIG. 1 is a schematic diagram generally illustrating a television audiovisual, recording and reproducing apparatus using a personal computer according to the present invention. In FIG. 1, a personal computer 1, for example, of a note type comprises a PCMCIA slot 2 conforming to the card bus specifications as an expansion slot. An PCMCIA card 3 is inserted into this PCMCIA slot 2, and a digital video box 5 is connected through an adaptor interface 4. The PCMCIA card 3, which belongs, for example, to the PCMCIA Type II Extended Type, employs MPEG2 encoder/decoder functions to perform compression, decompression (thaw) on a video signal.

The digital video box 5 is provided with a digital video board 6 which comprises an audio/video I/O interface. This digital video board 6 comprises a main board 7 on which a television tuner, a video encoder/decoder, an audio codec and the like are mounted; and a sub-board 8 on which a power system is mounted. The boards 7 and 8 are connected to each other via a connector 9. The main board 7 is provided with a television antenna terminal 10; an S video input terminal 11 for inputting a video signal; an RCA video input terminal 12; an S video output terminal 13 for outputting a video signal; an RCA video output terminal 14; an RCA audio input terminal (L) 15; an RCA audio input terminal (R) 16; an RCA audio output terminal (L) 17; and an RCA audio output terminal (R) 18. The sub-board 8 in turn is provided with an external power input terminal 19.

The television antenna terminal 10 is fed with a signal received by a television antenna, while the S video input terminal 11 for inputting a video signal, RCA video input terminal 12, RCA audio input terminal (L) 15, and RCA audio input terminal (R) 16 are fed with external signals, for example, from a video camera or the like. The S video output terminal 13 for outputting a video signal, RCA video output terminal 14, RCA audio output terminal (L) 17, and RCA audio output terminal (R) 18 are connected to an external monitor device or a video tape recorder (VTR).

Next, description will be made on the circuit configurations of the personal computer 1, PCMCIA card 3 and digital video box 5.

Figure 2:
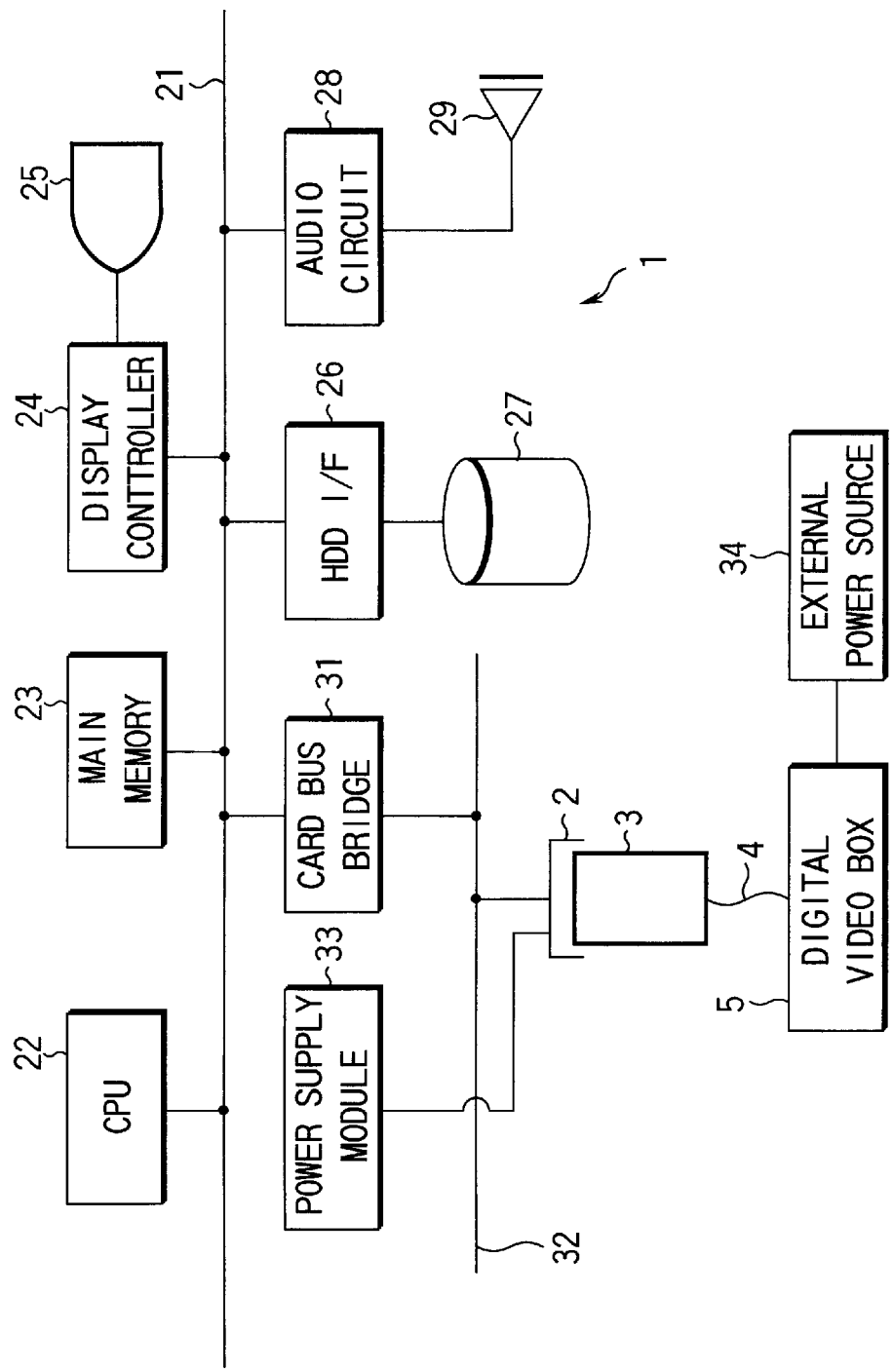
FIG. 2 is a circuit diagram illustrating the configuration of the personal computer in the embodiment.

FIG. 2 illustrates the circuit configuration of the personal computer 1, wherein a CPU 22 and a main memory 23 are connected to a PCI bus 21, and a display device, for example, a liquid crystal display (LCD) panel 25 is also connected to the PCI bus 21 through a display controller 24. Further a large capacity storage unit, for example, a hard disk (HDD) 27 is connected to the PCI bus 21 through an HDD interface (HDD I/F) 26 together with an audio circuit 28 and a speaker 29. The hard disk 27 is used as a secondary storage for the computer, to which a variety of information file and a variety of applications are written. In addition, the hard disk 27 is used as a recording medium for recording.

Also connected to the PCI bus 21 is a card bus 32 through a card bus bridge 31. The personal computer 1 also contains a power supply module 33 for supplying power to the respective circuit units. The power supply module 33 also supply the PCMCIA card 3 with the power.

The CPU 22, adapted to execute operation control and data processing for the overall system, executes a variety of processing such as initiation processing of a variety of applications, for example, a television video/audio processing application, a recording processing application and the like, screen display processing for executing a recording operation, and the like in accordance with programs stored in the main memory 23 and BIOS-ROM (not shown).

The main memory 23, which is used as a main memory, i.e., a system memory for the system, stores an operating system, an application program to be processed, user data created by the application program, and the like. The main memory 23 is also used as a buffer memory for temporarily storing a television video picture and television audio data. The main memory 23 may be implemented by a semiconductor memory such as DRAM which provides a high processing speed.

A connector for the PCMCIA slot 2 is connected to the card bus 32. As mentioned above, the PCMCIA card 3 is inserted into the PCMCIA slot 2, and connected to the digital video box 5 through the adaptor interface 4. This digital video box 5 is supplied with an operating voltage from an external power source 34. The PCMCIA card 3 is also supplied with an operating voltage from the power supply module 33 in the personal computer 1. This power, however, is supplied for detecting whether or not the personal computer is operating, such that the PCMCIA card 3 is supplied with the power from the external power source 34 through the digital video box 5 only when the personal computer 1 is operating.

Figure 3:
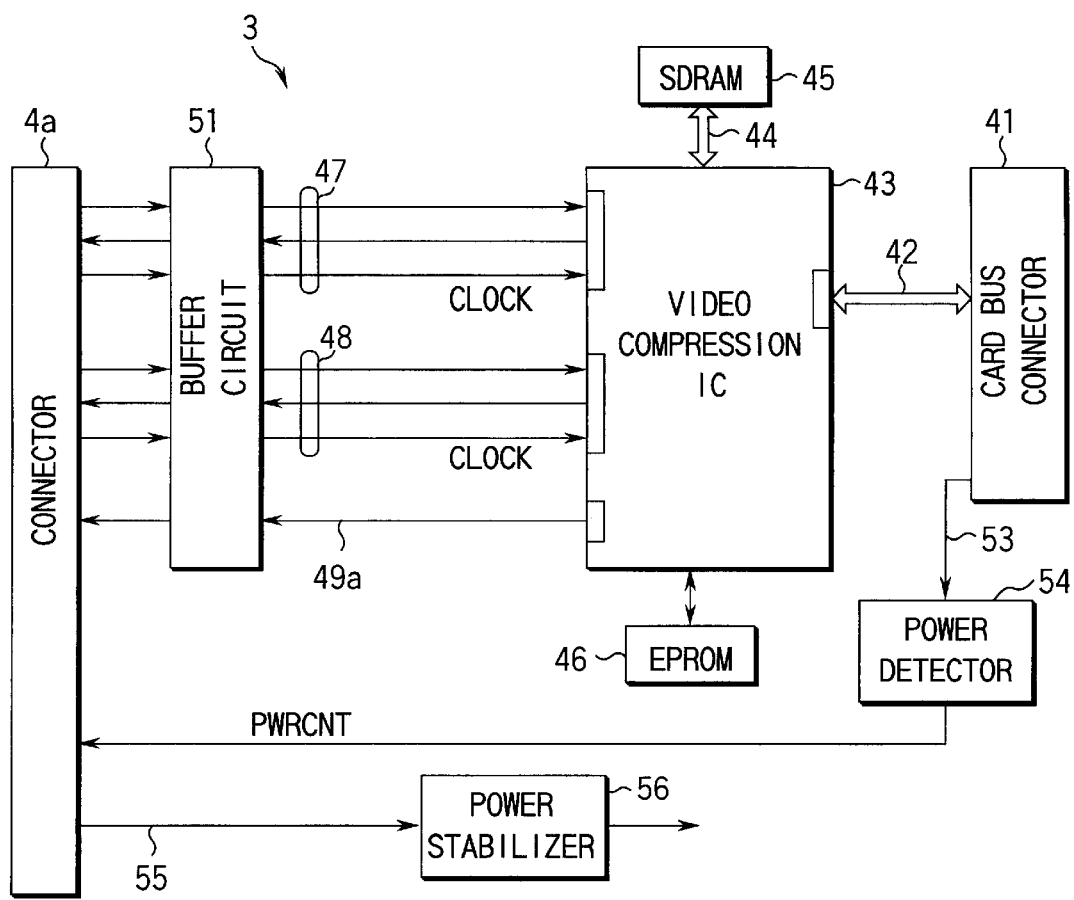
FIG. 3 is a circuit diagram illustrating the configuration of a PCMCIA card in the embodiment.

The internal circuit of the PCMCIA card 3 is configured as illustrated in FIG. 3. A video compression IC 43 is connected to the personal computer 1 through a card bus connector 41 and a PCI bus (card bus) 42. Connected to this video compression IC 43 are an SDRAM 45 through a local us 44 and an EPROM 46. The SDRAM 45 stores work data for the video compression IC 43, while the EPROM 46 stores the configuration.

The video compression IC 43, which has an encoder/decoder function, for example, in accordance with MPEG2, is connected to a buffer circuit 51 through a video signal bus 47, an audio signal bus 48 and a control bus 49a, and the buffer circuit 51 is connected to the connector 4a of the adaptor interface 4.

From the card bus connector 41, the power supplied from the power supply module 33 in the personal computer 1 is drawn out through a power supply line 53, and input to a power detector 54. The power detector 54 outputs a "1" signal when the personal computer 1 is operating, in other words, when a power supply voltage is supplied from the power supply module 33, and a "0" signal when the power supply voltage is not supplied. The output signal of the power detector 54 is sent to the digital video box 5 through a connector 52 as a power control signal PWRCNT. Also, a direct current voltage sent from the digital video box 5 is input to a power stabilizer 56 through the connector 52 and a power line 55, and a predetermined operating voltage is supplied to the video compression IC 43 and the SDRAM 45 from the power stabilizer 56.

Figure 4:
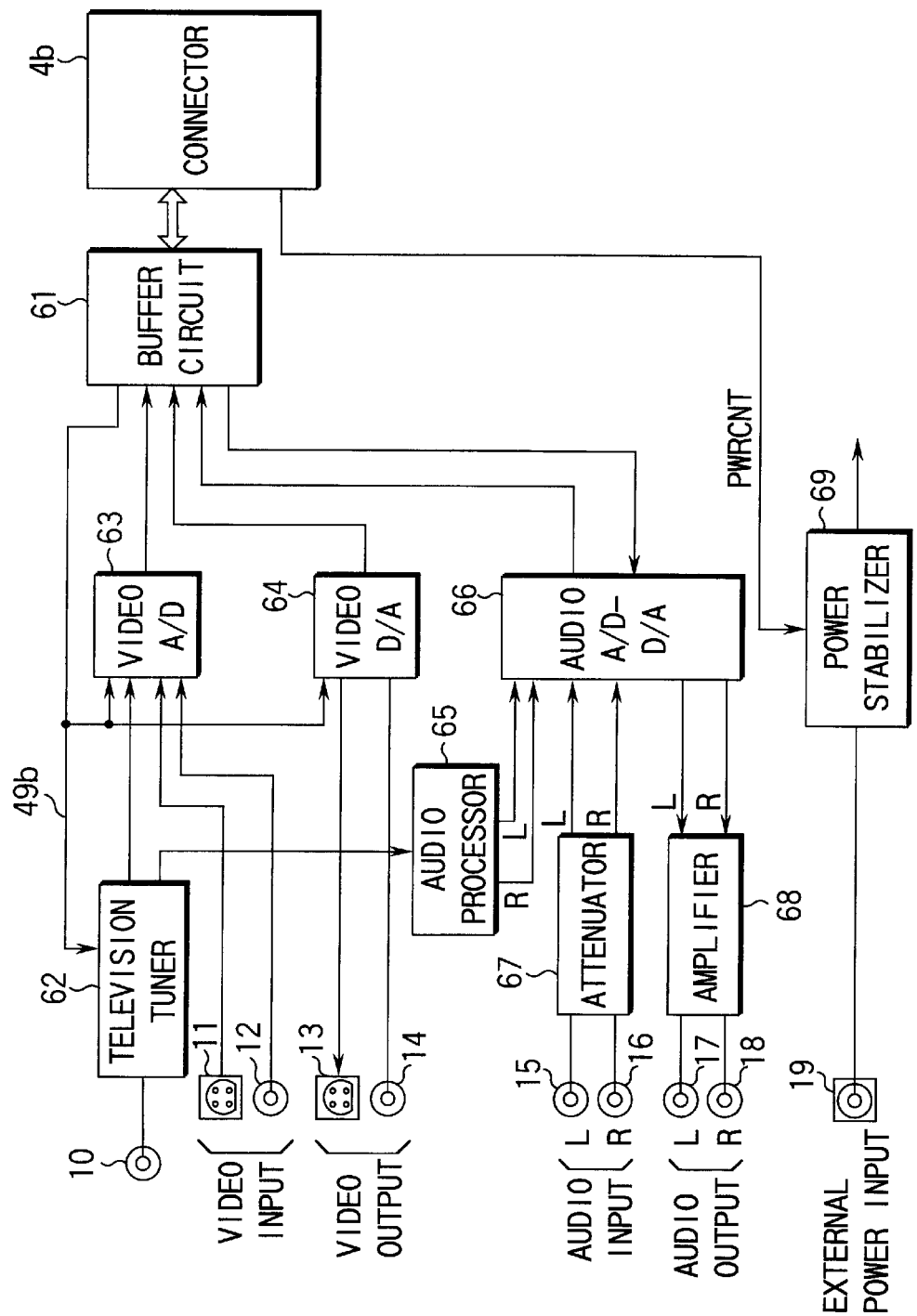
FIG. 4 is a circuit diagram illustrating the configuration of a digital video box in the embodiment.

The digital video box 5 is configured as illustrated in FIG. 4. As can be seen in FIG. 4, a connector 4b of the adaptor interface 4 is connected to a buffer circuit 61. A control signal sent to the buffer circuit 61 from the control bus 49a of the PCMCIA card 3 through the connector 4b is input to a television tuner 62, a video A/D converter 63, and a video D/A converter 64 through the control bus 49b.

The television tuner 62 receives a television broadcast radio wave input from the television antenna terminal 10, performs a channel selection and demodulation in accordance with control instructions, outputs a television video signal to the video A/D converter 63, and outputs a television audio signal to an audio processor 65. Also input to the video A/D converter 63 are video signals through the S video input terminal 11 and the RCA video input terminal 12. The video A/D converter 63 converts an input video signal to a digital signal which is output to the buffer circuit 61. The video D/A converter 64 in turn converts a video reproduced signal (digital signal) sent thereto from the personal computer 1 to an analog signal which is output to the S video output terminal 13 and to the RCA video output terminal 14.

The audio processor 65 separates an audio signal output from the television tuner 62 into television audio signals (L), (R) which are input to an audio A/D-D/A converter 66. Also input to the audio processor 65 are audio signals input to the RCA audio input terminal (L) 15 and the RCA audio input terminal (R) 16 through an attenuator 67. The audio A/D-D/A converter 66 converts an input audio signal to a digital signal which is output to the buffer circuit 61, and converts a reproduced television audio signal sent thereto from the personal computer 1 to an analog signal which is output to the RCA audio output terminal (L) 17 and the RCA audio output terminal (R) 18 through an amplifier 68.

The power control signal PWRCNT sent from the power detector 54 of the PCMCIA card 3 is output from the connector 4b, and input to the power stabilizer 69. The power stabilizer 69 is connected to the external power source 34 illustrated in FIG. 2 through the external power input terminal 19. The power stabilizer 69 outputs a power supply voltage when the power control signal PWRCNT is at "1" level, and stops outputting the power supply voltage when the power control signal PWRCNT is at "0" level. The output voltage of the power stabilizer 69 is supplied to respective circuits in the digital video box 5, as well as to the power stabilizer 56 of the PCMCIA card 3 through the connector 4b.

Next, description will made on the operation for performing the television audiovisual recording and reproducing processing using the personal computer 1. With the PCMCIA card 3 inserted in the PCMCIA slot 2 of the personal computer 1 and the digital video box 5 and the external power source 34 connected to the PCMCIA card 3 as illustrated in FIG. 2, as the personal computer 1 initiates a main application for controlling television viewing, external input viewing, recording, reproduction of a file, and the like, a video control panel 70 illustrated in FIG. 5 and a monitor window 101 illustrated in FIG. 6 are simultaneously displayed on the screen.

The video control panel 70 illustrated in FIG. 5 comprises a panel size switching button 72, an iconizing designation button 73 for designating the iconization of a panel, and an application end button 74 in an upper portion of the screen, and a display panel 75 is positioned below these buttons. This display panel 75 displays file names during file reproduction, and the names of broadcasting stations during television monitoring.

The display panel 75 also comprises an input source switching button 76, a television channel switching button 77, a status display portion (for displaying audio muted state, audio multiplexed state, repeat reproducing state, and a time shift) 78, a reproduction status display portion (a play mode display and a reproduction elapsed time display) 79, a recording status display portion (for displaying a recording mode, a recording elapsed time and recording residual time) 71, and a recording indicator (recording elapsed display) 80.

Below the display panel 75, there are provided a time shift (TIME SHIFT) button 81, a reproduction sliding bar 82, an audio muting button (MUTE) 83, an audio switching button (STEREO) 84 for switching stereo and left(L)/right(R), or main, sub and main+sub channels during a bilingual broadcast program, a button (REPEAT) 85 for designating A-B repeat, and a volume knob 86. Below these buttons, there are provided a reverse skip search button 87, a stop button 88, a reproduction button 89, a slow reproduction button 90, a pause button 91, a fast forward button 92, a forward skip search button 93, and a recording button 94.

Further, below the respective buttons mentioned above, i.e., in a lowermost portion of the display panel 75, there are provided an On/Off button (LIST) 95 for displaying a file manager, a file property setting button (SETTING) 96, a new reserve setting button (RESERVE) 97, a switching button (MONITOR) 98 for switching a television external input audiovisual mode and a file reproduction mode, and a help button 99.

In addition, the monitor window 101 illustrated in FIG. 6 is provided in an upper portion of the screen with a panel size switching button 102, an iconizing designation button 103 for instructing the iconization of the panel, and an end button 104. As the panel size switching button 102 is selected and right-clicked by a mouse or the like, a popup menu is opened for selecting a panel size, i.e., a monitor size, such that the panel size can be selected from three sizes, for example, "320×240," "640×480," and "full screen."

Television Audiovisual Recording and Reproducing Processing

As the aforementioned application is initiated, the video control panel 70 and the monitor window 101 are first displayed on the screen. Upon initiation of the application, the personal computer operates in a television or external input audiovisual state. These settings are preserved in an application initial setting file of the video control panel 70.

The television audiovisual recording and reproducing processing can be arbitrarily performed by selecting and clicking on a particular button displayed on the video control panel 70. For example, when one desires to watch a television program, the button 98 for switching the television external input audiovisual mode and the file reproduction mode is clicked by a mouse to designate the television external input audiovisual mode, and the television audio visual mode is designated by the input source switching button 76. This results in displaying a video signal and an audio signal of a channel selected by the television tuner 62 of the digital video box 5 on the monitor window. In this event, an arbitrary television channel can be selected by clicking on the television channel switching button 77.

The processing involved in the foregoing television watching will be described with reference to FIGS. 2 to 6.

Figure 5:
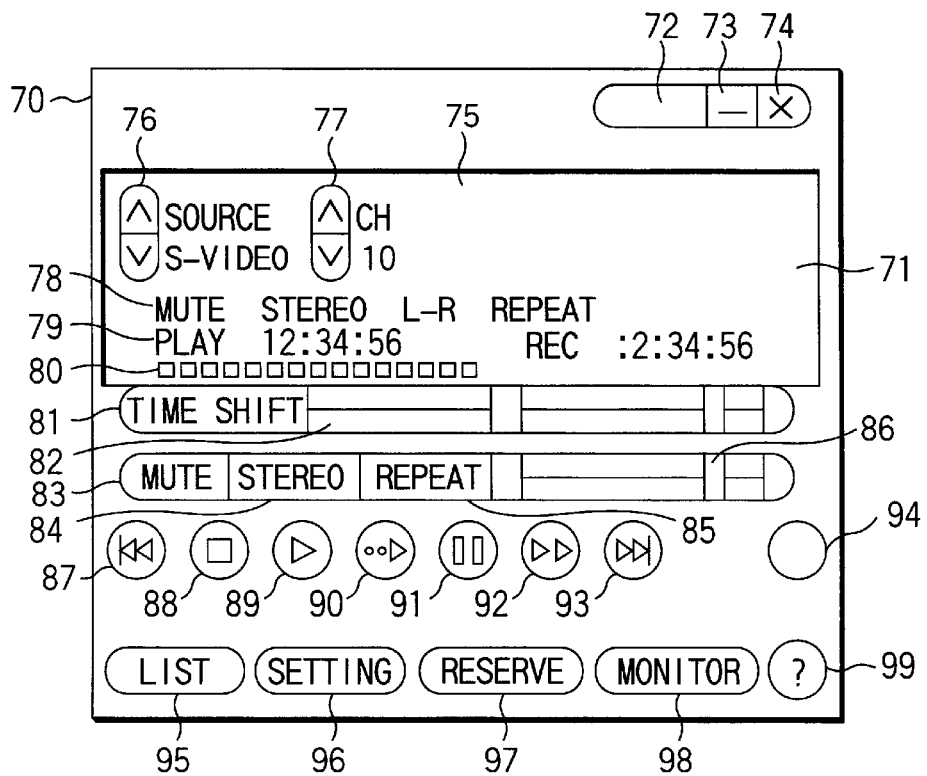
FIG. 5 is a diagram illustrating an example of a display on a screen of a video control panel in the embodiment.
Figure 6:
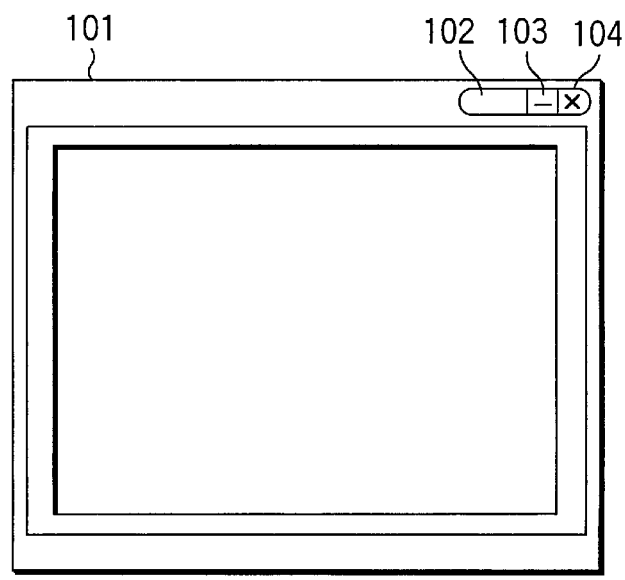
FIG. 6 is a diagram illustrating an example of a display on a screen of a monitor window in the embodiment.

On the video control panel 70 illustrated in FIG. 5, as the television external input audiovisual mode is designated by the switching button 98 for switching the television external input audiovisual mode and the file reproduction mode, and the television audiovisual mode is designated by the input source switching button 76, a video signal of a designated channel is output from the television tuner 62 of the digital video box 5 in FIG. 4, converted to a digital signal by the video A/D converter 63, and input to the buffer circuit 61. Also, a television audio signal output from the television tuner 62 is separated by the audio processor 65 into an L (left) signal and a right (R) signal, then converted to digital signals by the audio A/D-D/A converter 66, and input to the buffer circuit 61. This buffer circuit 61 outputs the television video signal from the video A/D converter 63 and the television audio signal from the audio processor 65 to the PCMCIA card 3 illustrated in FIG. 3.

The television video signal and audio signal sent to the PCMCIA card 3 is input to the video compression IC 43 through the buffer circuit 51. This video compression IC 43 compresses the video signal based on the MPEG2 specifications, but does not compress the audio signal, and transmits the resulting signals to the personal computer 1.

Image and Audio Processing in Personal Computer 1

Figure 7:
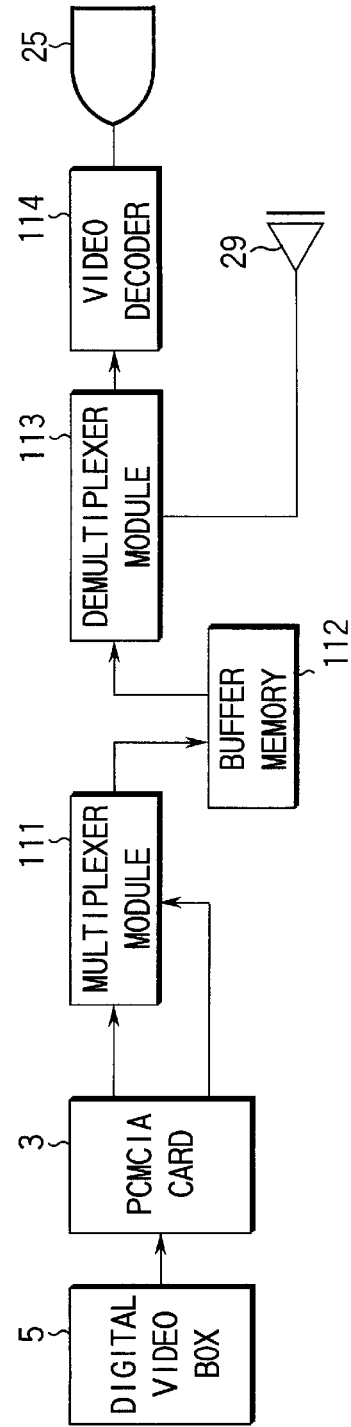
FIG. 7 is a block diagram illustrating a general processing system for viewing a television program in the embodiment.
Figure 8:
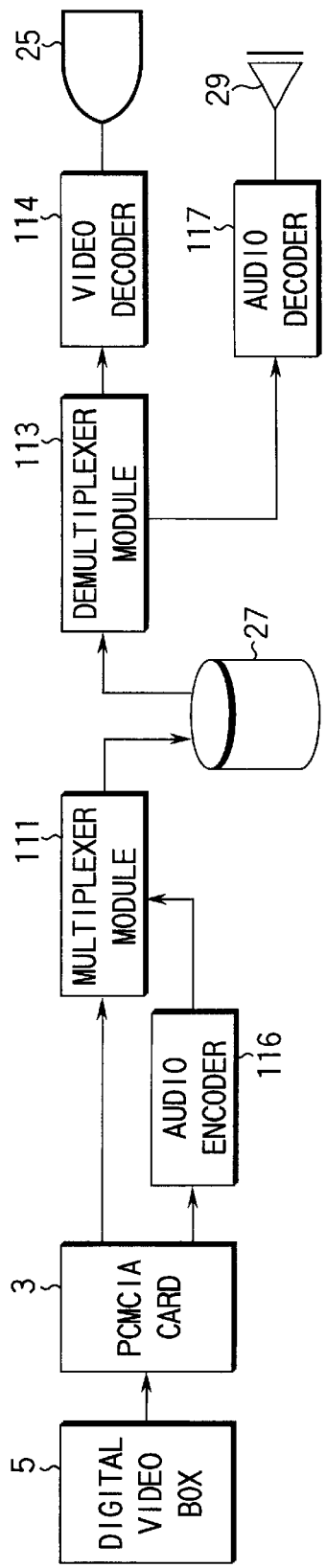
FIG. 8 is a block diagram illustrating a general processing system for viewing and recording a television program in the embodiment.

In the personal computer 1, the video and audio signals sent from the PCMCIA card 3 are processed by a processing system illustrated in FIGS. 7 and 8. FIG. 7 is a block diagram illustrating a processing system for viewing a television program, and FIG. 8 is a block diagram illustrating a processing system for recording a program.

First, the processing involved in the viewing of a television program will be described with reference to FIG. 7. The personal computer 1 inputs the television video signal and audio signal sent thereto from the PCMCIA card 3 to a multiplexer module 111 in accordance with the control of the CPU 22 to multiplex the television video signal and audio signal in a synchronized state, i.e., matching the timing of the television video signal and audio signal. The multiplexed signal is input to a demultiplexer module 113 through a buffer memory 112. As a buffer memory 112, the main memory 23, for example, may be used for fast processing. The demultiplexer module 113 demultiplexes the television video signal and audio signal read from the buffer memory 112, inputs the compressed video signal to a video decoder 114 for decompression, and displays the resulting video signal on the LCD 25. The audio signal demultiplexed by the demultiplexer module 113 in turn is input to the audio circuit 28 for driving the speaker 29.

For only viewing a television program as mentioned above, only the video signal having a large data capacity is compressed, subsequently compressed by the multiplexer module 111 for matching the timing of the video signal and the audio signal, and temporarily stored in the buffer memory 112. As the buffer memory 112, a fast memory such as the main memory 23 is used for speeding up write/read of the video signal and the audio signal.

By once compressing the video signal in the PCMCIA card 3 and decompressing the compressed video signal in the personal computer 1 as described above, transfer of high quality television data, which would generally be impossible, can be accomplished with the PCMCIA card.

Then, for recording the viewed picture, recording is instructed by clicking on the recording button 94 on the video control panel 70 illustrated in FIG. 5. As the recording button 94 is clicked, the main application switches the processing system illustrated in FIG. 7 to that illustrated in FIG. 8.

From the PCMCIA card 3, a compressed television video signal and a non-compressed audio signal are input to the personal computer 1, as described above. The personal computer 1 inputs the television video signal sent thereto from the PCMCIA card 3 to the multiplexer module 111, and inputs the non-compressed television audio signal to an audio encoder 116 to compress the television video and audio signals in accordance with the specifications of MPEG1 Layer 2. The resulting signals are input to the multiplexer module 111. The multiplexer module 111 multiplexes the compressed video signal and audio signal, while matching the timing the signals. The multiplexed signal is written into the hard disk 27 for recording.

The data recorded in the hard disk 27 is read to the demultiplexer module 113 to demultipex it into the television video signal and audio signal. The video signal is decompressed by a video decoder 114 and displayed on the LCD 25. The audio signal demultiplexed by the demultiplexer module 113 in turn is decompressed by an audio decoder 117 in the audio circuit 28, and output to the speaker 29.

The hard disk 27 is capable of performing data write and read simultaneously, so that data can be recorded as it is read out for reproduction.

As the reproduction sliding bar 82 is shifted to the left during the normal recording operation, or as the time shift button (TIME SHIFT) 81 is depressed, a time shift reproduction mode is entered. The time shift reproduction mode is a function of reproducing a currently recorded file retrospective to a previous time, while the recording is continued, during a television or video recording operation. From a reproduction time at the position at which the reproduction sliding bar 82 has been returned to the left, the currently recorded file can be reproduced. In the time shift reproduction mode, a display "TIME SHIFT" is blinked, and a recording indicator (bar graph) 80 and the reproduction sliding bar 82 begin moving from the leftmost position over time. In other words, the recording indicator 80 and the reproduction sliding bar 82 display a recording elapsed time.

As the reproduction sliding bar 82 is shifted to an arbitrary intermediate position in the time shift reproduction mode, the currently recorded file is reproduced on the monitor window 101 retrospective to the corresponding time. Then, as the time shift (TIME SHIFT) button 81 is clicked, the time shift reproduction is terminated.

For stopping the recording, the stop button 88 or the recording button 94 is clicked. The recorded video file is preserved in a predetermined directory in the hard disk 27 with a file name, given in accordance with predetermined rules, based on a recording start time. The preservation of the recorded video file will be described later in detail.

Recording Reserve

For the recording reserve, a new reserve setting button 97 is clicked on the video control panel 70. Clicking on the new reserve setting button 97 results in displaying the new reserve window 121 illustrated in FIG. 9 on the screen. The new reserve window 121 displays setting items such as channel, recording start date, recording start time, recording end date, recording end time, title name, program category name, program memo, and recording mode, and provides a cancel button 122 and a reserve setting button 123. FIG. 10 shows setting parameters involved in the recording reserve, wherein the items except for the title name, program category name and program memo are indispensable items.

Next, description will be made on the processing for generating a warning, canceling a reserve, or the like when the PCMCIA card 3 comes off from the personal computer 1 for some reason after recording has been reserved as described above, with reference to a flow chart of FIG. 11.

Figure 11:
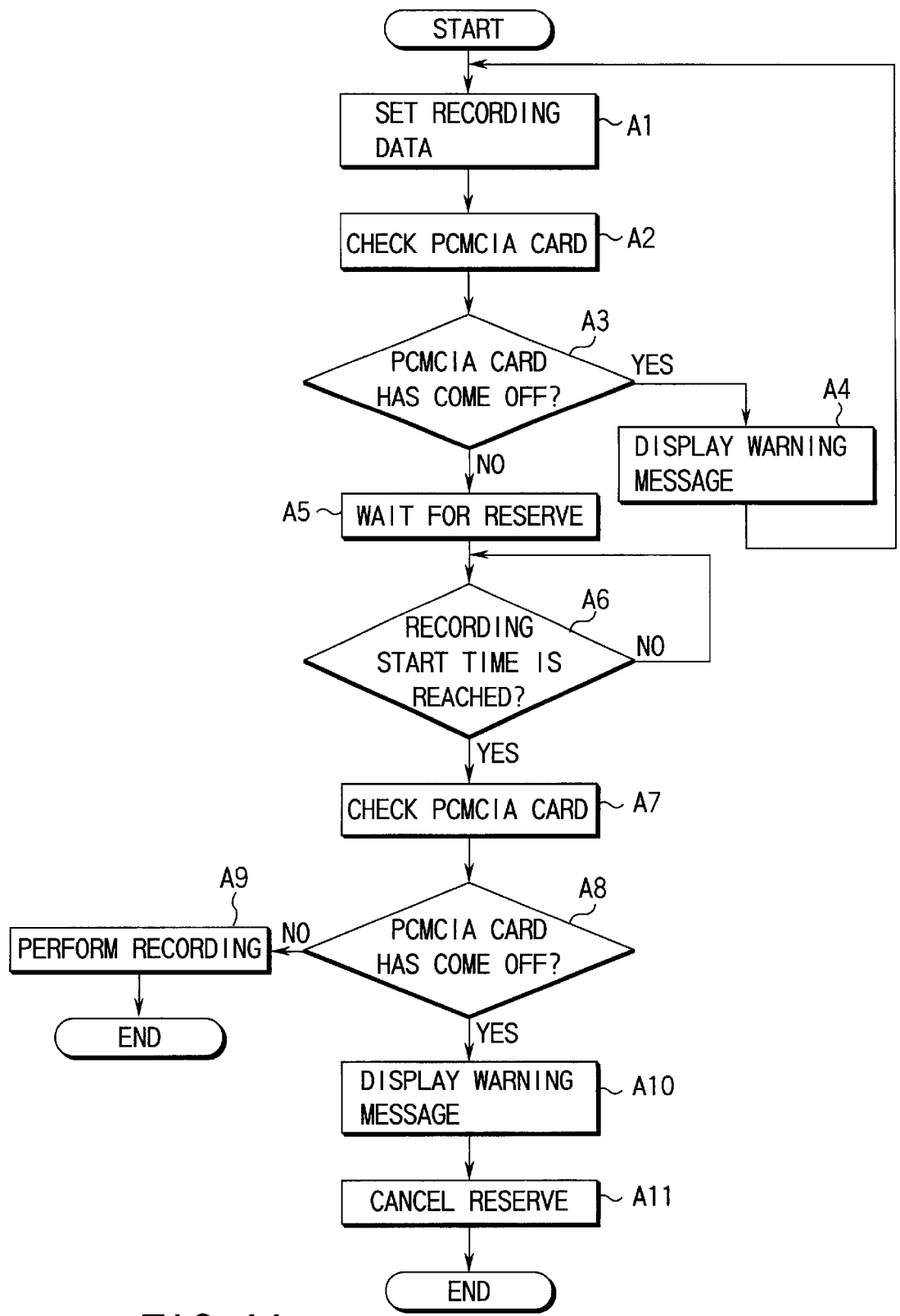
FIG. 11 is a flow chart illustrating a routine executed when a PCMCIA card is removed from the personal computer in the embodiment.

As illustrated in FIG. 11, when the reserve setting button 123 is clicked after recording data have been set (step A1), the PCMCIA card 3 is checked for its inserted state (step A2). More specifically, it is determined whether or not the PCMCIA card 3 has come off from the PCMCIA slot 2 of the personal computer 1 (step A3). If the PCMCIA card 3 has come off, a warning message is displayed on the screen of the LCD 25, for example, "Card has come off. Please insert properly." or the like (step A4). In this event, alarming sound may be generated simultaneously with the warning message. After displaying the warning message, the flow returns to step A1 to display the new reserve window 121 to prepare again for reserve settings.

When it is determined at step A3 that the PCMCIA card 3 does not come off, a reserve waiting state is maintained as it has been (step A5).

Next, it is checked whether or not a recording start time is reached (step A6). When the recording start time is reached, the inserted state of the PCMCIA card 3 is again checked (step A7). It is determined whether or not the PCMCIA card 3 has come off from the PCMCIA slot 2 of the personal computer 1 (step A8), and the recording is performed if not (step A9).

If it is determined at step A8 that the PCMCIA card 3 has come off, a warning message is displayed on the screen of the LCD 25, for example, "Card has come off. Please insert properly. Recording reserve is canceled." or the like (step A10), and the recording reserve is subsequently canceled (step A11).

As described above, if the PCMCIA card 3 has come off after the recording reserve was set, the warning message is displayed at step A4, so that the user can confirm the message and properly insert the PCMCIA card 3 to perform the recording reserve. Also, when the PCMCIA card 3 was properly inserted when the recording reserve was set, but the PCMCIA card 3 comes off for some reason afterward, the PCMCIA card 3 is detected immediately before the recording is performed to display the warning message and cancel the reserve. In this event, the user can confirm that the recording reserve is canceled from the warning message.

Preservation of File Image

Description will next made on the processing for preserving a recorded file picture in the hard disk 27. In the present invention, when a television program, for example, is recorded in a large capacity recording medium, for example, the hard disk 27 to preserve it as a video file, the recorded file is automatically classified and preserved based on property information such as the recorded time, the television channel and the like, or the property information is automatically combined to create a file name to facilitate the user's search.

Figure 12:
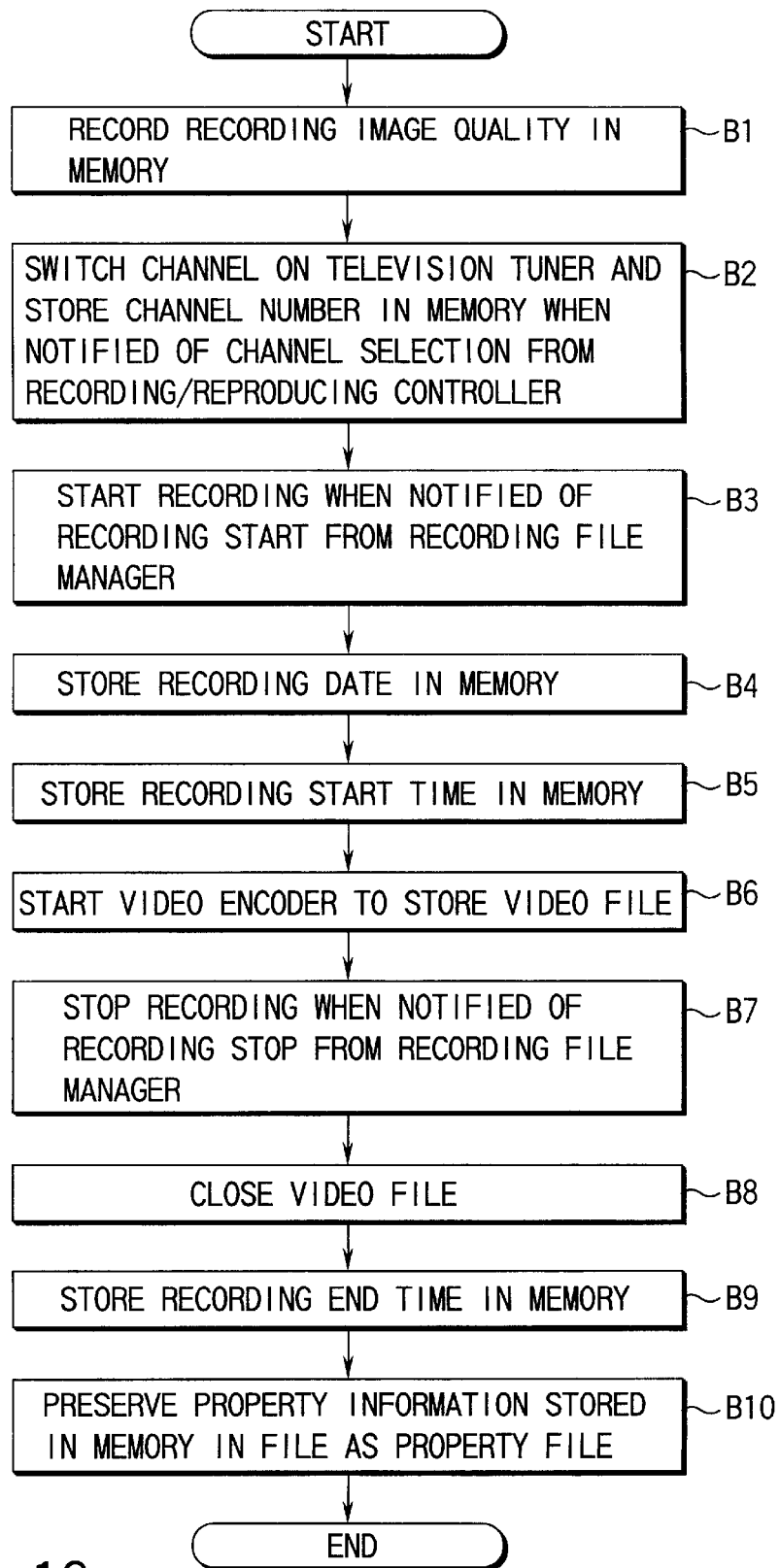
FIG. 12 is a flow chart illustrating a routine executed when a recorded file is automatically classified and preserved based on property information such as a recording time in the embodiment.

A flow chart of FIG. 12 illustrates an example in which a television program, for example, is recorded in the hard disk 27 to preserve it as a video file, such that the recorded file is automatically classified and reserved based on the property information such as the recorded time, the television channel and the like.

First, when a television program is recorded, a recording mode such as a high quality mode, a standard mode, a ling time mode, or the like, set on the video control panel 70 illustrated in FIG. 5, is stored in a memory (step B1). Also, when a channel is selected by the television channel switching button 77, the channel number is stored in the memory (step B2). Next, when the recording is instructed by the recording button 94, the recording is started (step B3), the recording date is stored in the memory, and the time is inquired to a timer unit (not shown) to store the recording start time in the memory (steps B4, B5).

As illustrated in FIG. 8, a compressed video signal sent from the PCMCIA card 3 is input to the multiplexer module 111, and a non-compressed audio signal is compressed by the audio encoder 116 and input to the multiplexer module 111, wherein the two signals are compressed and stored on the hard disk 27 (step B6).

Subsequently, as the stop button 88 is clicked on the video control panel 70, the recording is stopped (step B7), and the video file recorded in the hard disk 27 is closed (step B8). Also, in this event, the recording end time is stored in the memory (step B9). The property information stored in the memory are preserved in the hard disk 27 as a property file linked to the recording file (step B10).

Figures 13, 14:
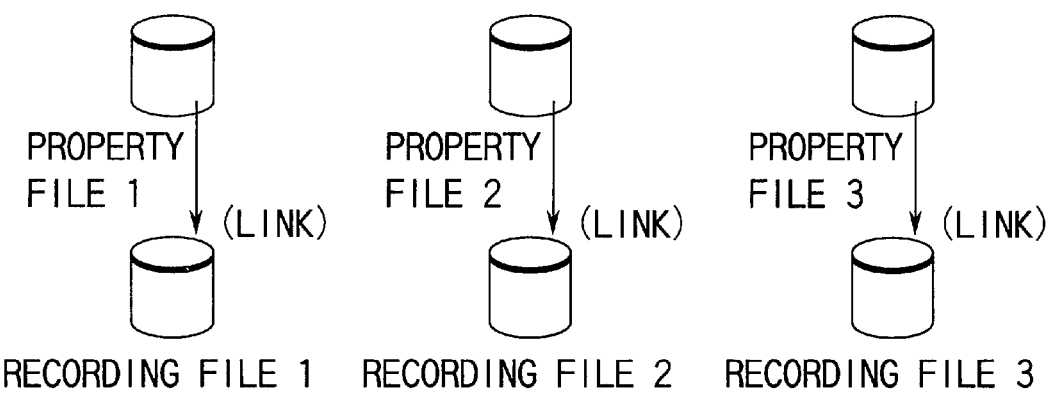
FIG. 13 is a table showing an example of description in a property file for a recording operation in the embodiment.
FIG. 14 is a diagram illustrating the relationship between property files and recording files in a recording operation in the embodiment.

The property file records such information as recording start time, television channel number, recording duration, recording mode, video file name and the like, as shown in an exemplary description in FIG. 13. FIG. 14 shows the relationship between property files and recording files.

Figure 15:
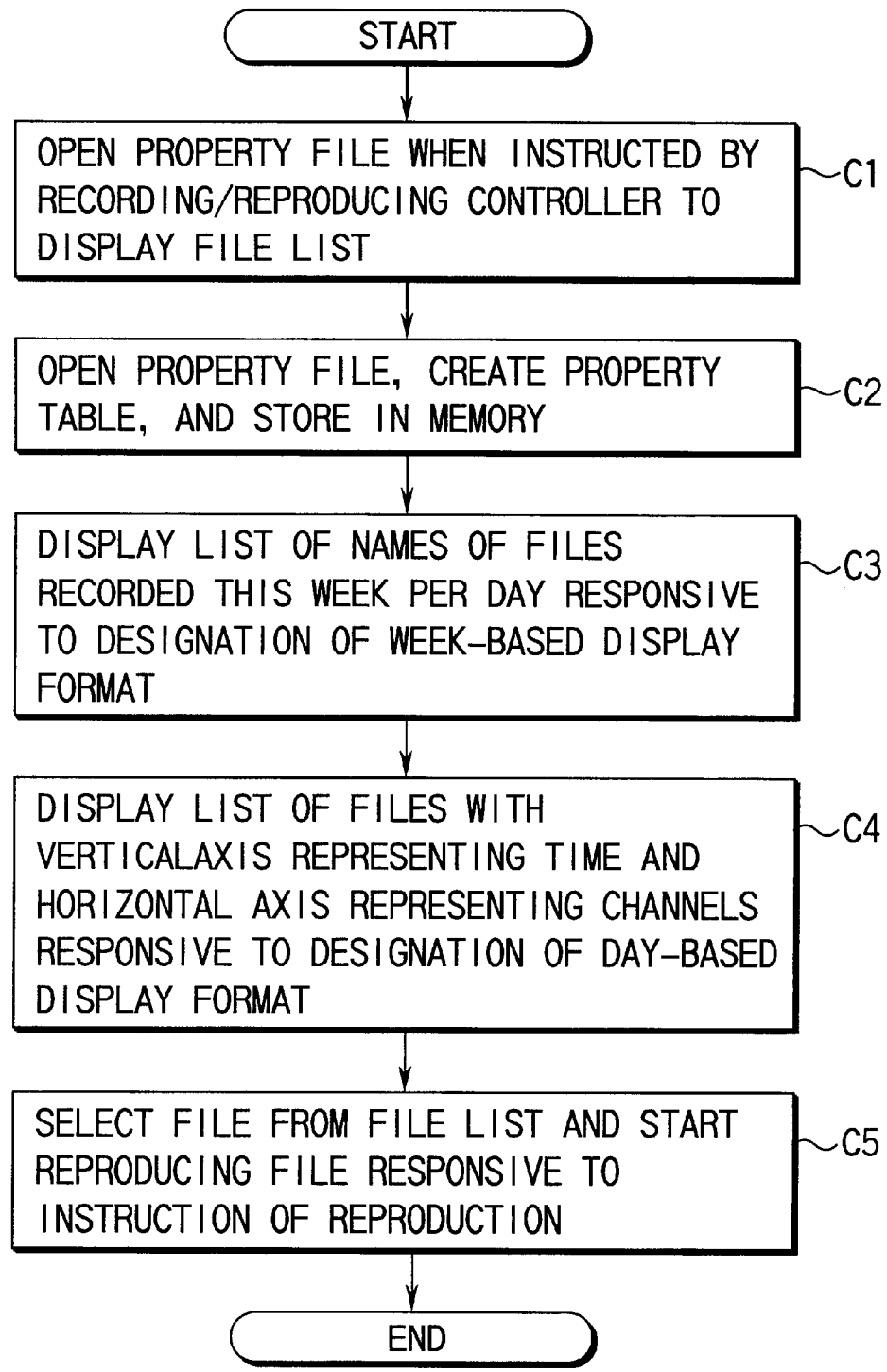
FIG. 15 is a flow chart illustrating a routine executed when a list of recording files is displayed for reproducing a file in the embodiment.

The property files are used when a list of recording files is displayed in accordance with an instruction from the user. When the user wants to see the list of recording files, the user clicks on the On/Off button 95 on the file manager display of the video control panel 70. Clicking on the On/Off button 95 initiates the execution of the processing illustrated in FIG. 15. First, as the On/Off button 95 is displayed on the file manager display, property files previously recorded in the hard disk 27 are opened (step C1), and a property table, for example, as illustrated in FIG. 16 is created from the property files, and stored in a memory (step C2).

In this event, a guiding display is provided on the screen for selecting a display format for recording files. More specifically, the list of recording files can display a list of recorded files in weeks or in days, such that the user can select any of the options.

FIG. 17 shows an example of a file list displayed in weeks, while FIG. 18 illustrates an example of a file list displayed in days. When the week-based display format is selected, a list of the names of files recorded this week is displayed for each day of week with reference to a date key of the property table (step C3). Also, when the list is switched to a day-based display format or when the column of the date is clicked by a mouse or the like while the list is displayed in the week-based display format, the property table is searched for only files having the designated date. Then, with the recording start time and the television channel number used as keys, a list of files recorded on the designated date is displayed (step C4). This list of files may be displayed in a matrix, such as a television program display format, with the vertical axis representing the time and the horizontal axis representing television channel numbers as shown in FIG. 17, wherein the recorded files are displayed in frames defined by corresponding times and television channels. The user, when viewing this program table, can understand from what time the user recorded a program of which channel. FIG. 17 shows an icon associated with a file 1 recorded from 21:00 to 22:00 on the first channel (1 ch), and an icon associated with a file 2 recorded from 23:00 to 24:00 on the sixth channel (6 ch).

As the user selects a desired file or icon on the file list and clicks on [REPRODUCTION] button, reproduction of the recording file is started (step C5).

As described above, the list of recorded files are displayed based on the property information such as the recorded date and time, channel and the like, it is possible to readily retrieve a target file desired by the user to reproduce from the file list.

Next, description will be made on an example of setting a file name for a recorded file. In the setting of a file name to a file, the user is allowed to previously set which property is preferentially employed as a file name for a television video picture to be recorded. The processing involved in this setting will be described with reference to a flow chart illustrated in FIG. 19.

Figures 19, 20:
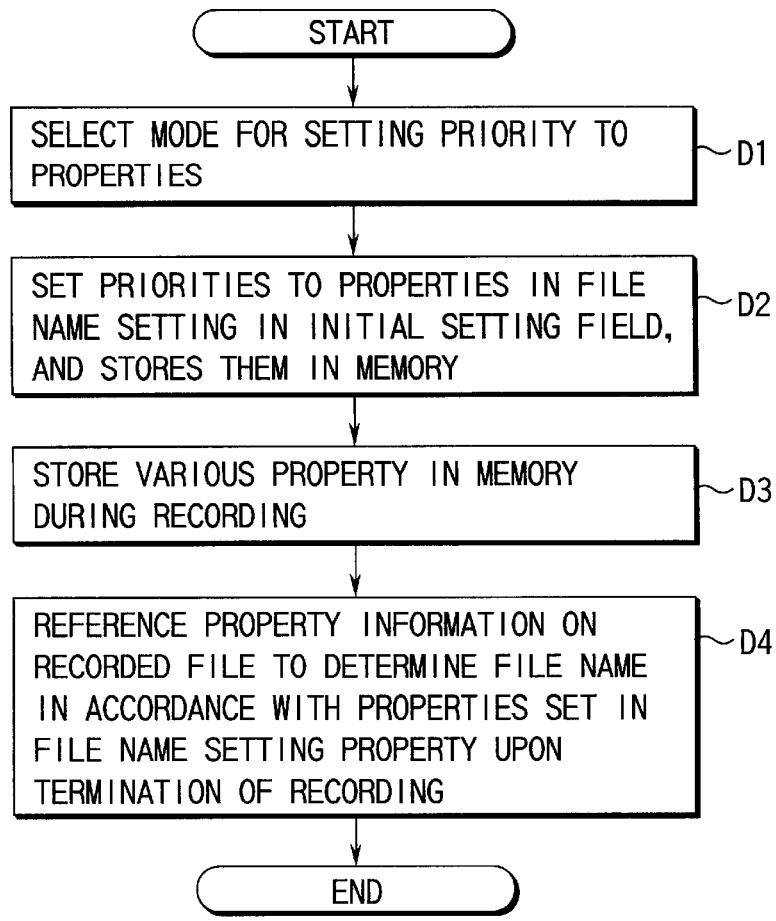
FIG. 19 is a flow chart illustrating a routine executed when a file name is set for a recorded file in the embodiment.
FIG. 20 is a diagram illustrating an example of a screen display for setting priority to properties when a file name is set for a recorded file in the embodiment.

For setting the priority to properties for setting a file name, the user clicks on the On/Off button 95 on the file manager display of the video control panel 70 to display the file manager. This file manager displays a screen for the selection related to the setting of the priority to properties for setting a file name. As the user selects a mode for setting the property priority (step D1), a screen for setting the priority to properties for setting a file name is displayed as illustrated in FIG. 20. On this screen, the user arbitrarily designates the priority to properties for setting a file name (step D2). FIG. 20 shows an example in which (1) a television channel number and (2) a registered time are set as highest priorities. The priorities set to the properties as described above are stored in the memory.

After the setting has been made, a television program is recorded. In this recording processing, a variety of properties are stored in the memory as previously illustrated in the flow chart of FIG. 12 (step D3). As the recording is completed, the property information associated with a recorded file is referenced to determine a file name in accordance with the properties which have been set in "the priority to properties for setting a file name," and the determined file name is recorded in the hard disk 27 as a property file linked to the recording file (step D4).

Assume, for example, that the property information associated with the recorded file is:

Television Channel Number: 1 ch (channel)
Recording Date: Sep. 03, 1999
Recording Time: 20:00
Recording Duration: 20 Minutes
Recording Mode: High Definition Mode When "Television Channel Number" and "Registration Time" are set in this order in the initial setting as shown in FIG. 20, the file name is determined to be "1ch-September-03-20:00.mpg." Alternatively, when "Recording Date" and "Recording Mode" are set in this order in the initial setting, the file name is determined to be "1999-Sep.-03-High Definition Mode.mpg."

By automatically giving a file name based on previously set property information as described above, the user is not required to perform tedious manipulations of inputting a file name. In addition, such a file name can help rearrange files.

Transfer of File from Recording Reserve Folder to Recording End Folder

Description will next be made on the management of a recording reserve folder and a recording end folder.

Figure 21:
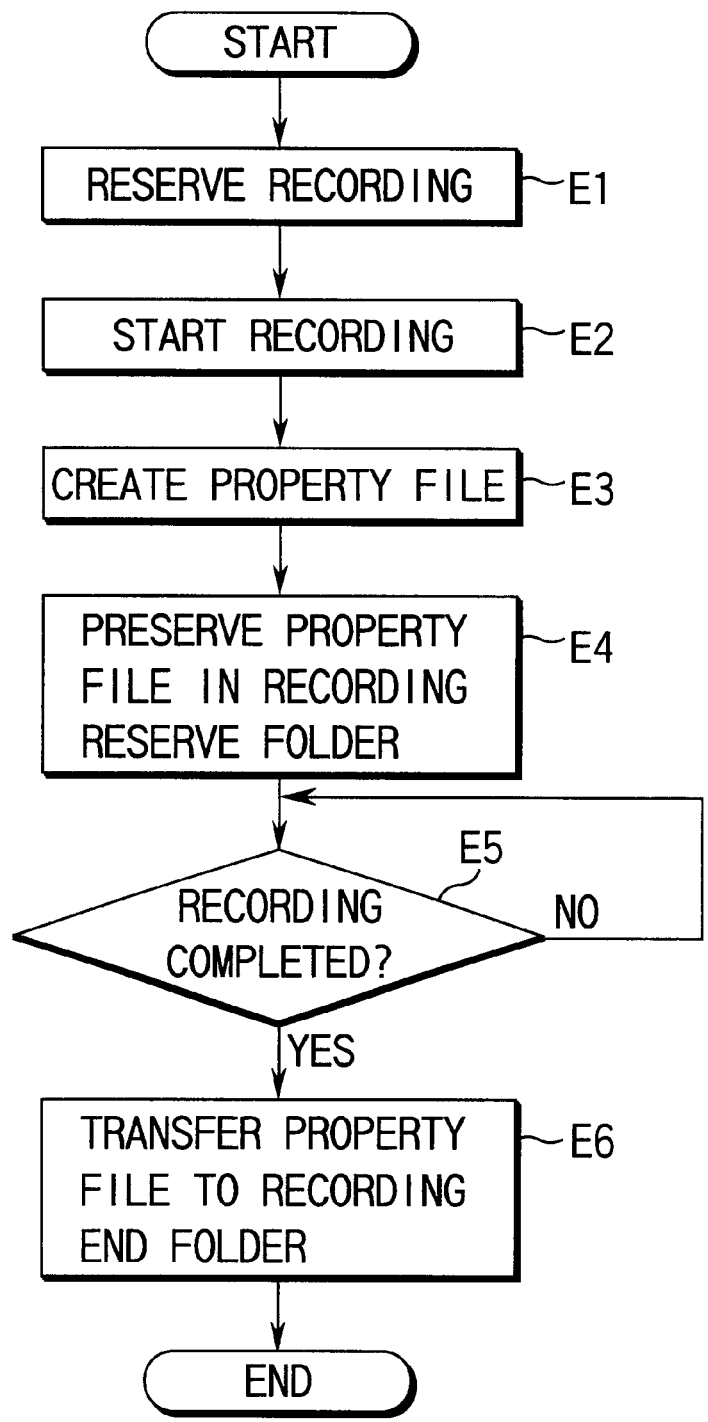
FIG. 21 is a flow chart illustrating a routine executed for transferring a property file from a recording reserve folder to a recording end folder when a television program is recorded using a recording reserve in the embodiment.

In the present invention, the properties related on recording are managed separately in a recording reserve state and a recording completion state. The processing involved in this transfer of a file from the recording reserve folder to the recording end folder will be described with reference to a flow chart illustrated in FIG. 21. A recording reserve is made by clicking on the new reserve setting button 97 on the video control panel 70, and displaying the new reserve window 121 previously illustrated in FIG. 9 on the display (step E1). As the reserve setting button 123 is clicked after reserve information has been entered on the reserve screen, the reserve is completed to close the new reserve window, and a new reserve list is additionally preserved in the recording reserve folder, for example, in the hard disk 27. The contents of the recording reserve folder can be confirmed by clicking on the On/Off button 95 on the file manager display of the video control panel 70 and selecting the recording reserve folder to display the contents on the screen.

Figure 22:
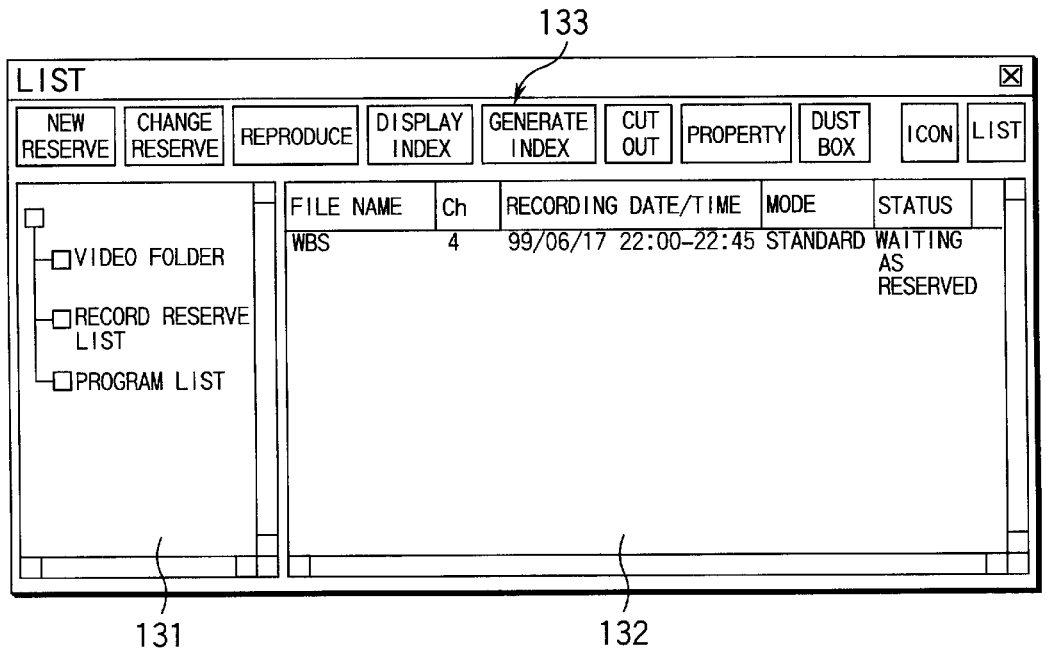
FIG. 22 is a diagram illustrating an example of a displayed list in the recording reserve folder in the embodiment.

FIG. 22 illustrates an example of a displayed list in the recording reserve folder. The displayed list displays a tree view 131, a list view 132, and command buttons 133. The tree view 131 displays three folders, for example, "VIDEO FOLDER," "RECORDING RESERVE LIST," and "PROGRAM LIST," and as an associated folder icon is clicked, a list of files within the folder is displayed in the list view 132.

The list view 132 has two modes, i.e., an ordered list and an icon list, and the display is switched by clicking "ICON" and "LIST" buttons on the list. Those command buttons 133 which are available in accordance with the respective display modes in the tree view 131 become active.

When "RECORDING RESERVE LIST" is selected in the tree view 131, the list view 132 displays items "FILE NAME," "ch (CHANNEL)," "RECORDING DATE AND TIME," "RECORDING MODE," and "STATUS" for each reserved program, and "WAITING AS RESERVED" is displayed in the item "STATUS."

As the recording of a television program, for which the recording was reserved, is started (step E2), a property file is created including, for example, a recording date, start time, channel, program title, program category, file name and the like (step S3), and preserved in the recording reserve folder (step E4). The property file created in the recording can be confirmed on the recording reserve folder.

Figure 23:
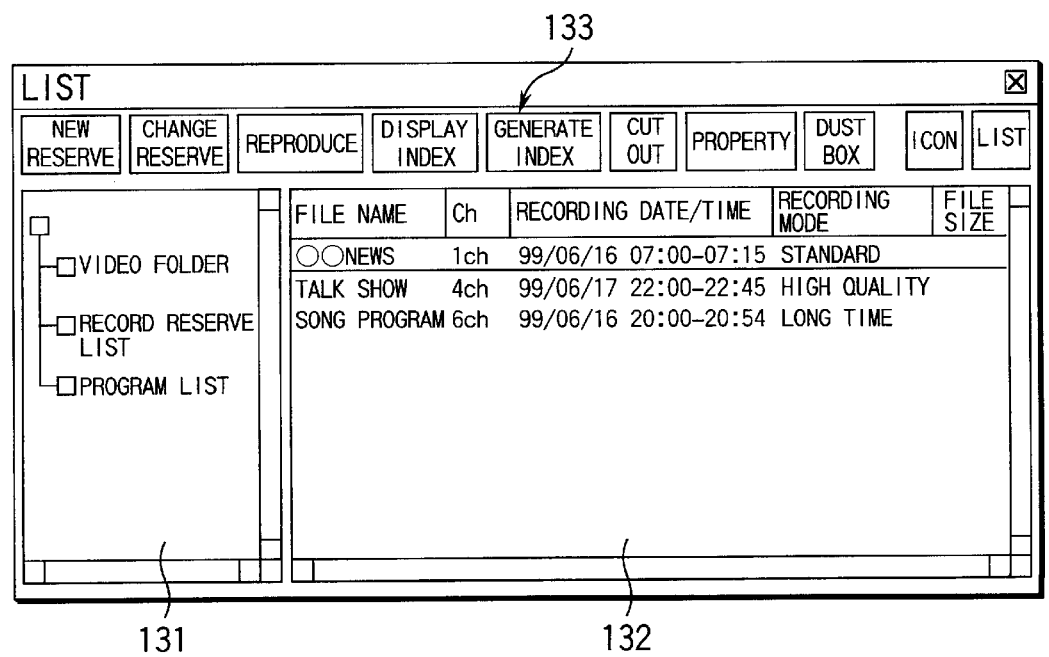
FIG. 23 is a diagram illustrating an example of a list of recorded programs displayed in a list view in the embodiment.

Subsequently, it is determined whether or not the recording is completed (step E5), and the recording processing is continued if not. Upon determining that the recording is completed, the property file preserved in the recording reserve folder is transferred to the recording end folder (step E6). As the property file is transferred to the recording end folder, the property file after the completion of the recording can be confirmed on the recording end folder. For example, on the list display the screen illustrated in FIG. 22, when "VIDEO FOLDER" in the tree view 131 is clicked, a list of recorded programs is displayed in the list view 132 as illustrated in FIG. 23, so that the property can be confirmed.

By transferring the reserve setting information preserved in the recording reserve folder and the properties created during recording to the recording end folder after the completion of the recording as described above, file information before the recording and file information after the recording can be definitely distinguished, thereby allowing the user to readily and reliably distinguish and confirm both the information without confusing them.

Image Editing Method

Figure 24:
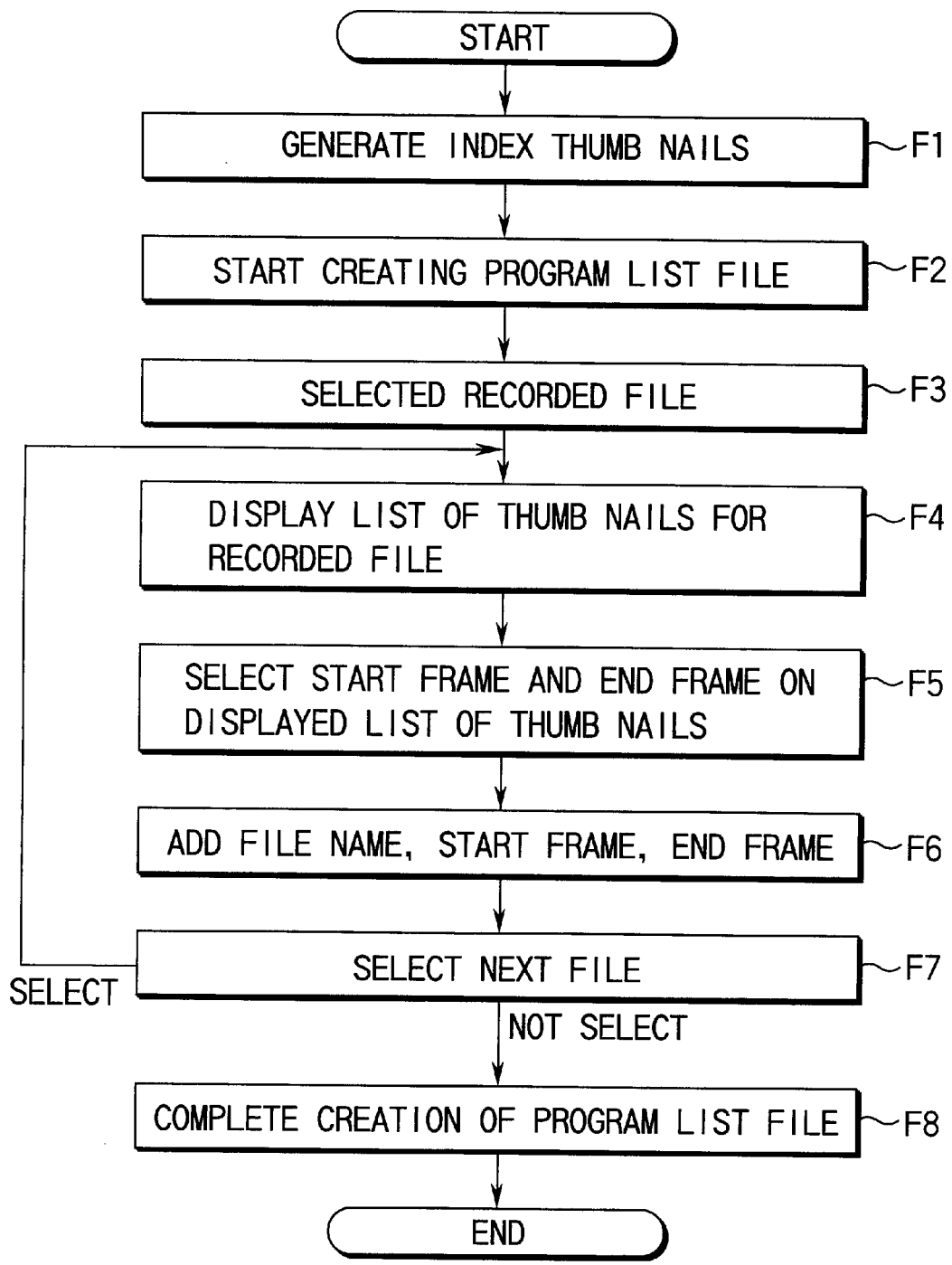
FIG. 24 is a flow chart illustrating a routine for generating a program list file for a plurality of recorded files with reference to index thumb nails in the embodiment.

Description will next be made on a video editing method for designating ranges on a plurality of recorded files, referring to index thumb nails, to produce a program list file, with reference to a flow chart illustrated in FIG. 24.

First, index thumb nails (picture indexes) are generated for video files (step F1). For generating the index thumb nails, a file is selected, for example, on the displayed list of video file lists illustrated in FIG. 23, and clicking a [GENERATE INDEX] button. The clicking on the [GENERATE INDEX] button results in analyzing the selected video file to generate thumb nails therefor.

For generating the index thumb nails, the following method may be used, by way of example. Pictures (video pictures) recorded in a selected video file are sequentially read from the hard disk 27, and alternately stored in a plurality of, for example, two memories to compare the similarities of the pictures stored in the two memories. When the two pictures stored in the two memories present high similarities, index information is not generated, determining that the same scene is continuing. When the two pictures stored in the two memories present extremely low similarities, the picture is stored as index information, determining that a previous scene has been changed to another. In the alternative, when video pictures are compressed by the video compression IC 43 in the PCMCIA card 3 in accordance with the specification of MPEG2, information related to the correlation between frames of the pictures is added, so that this information may be utilized.

Figure 25:
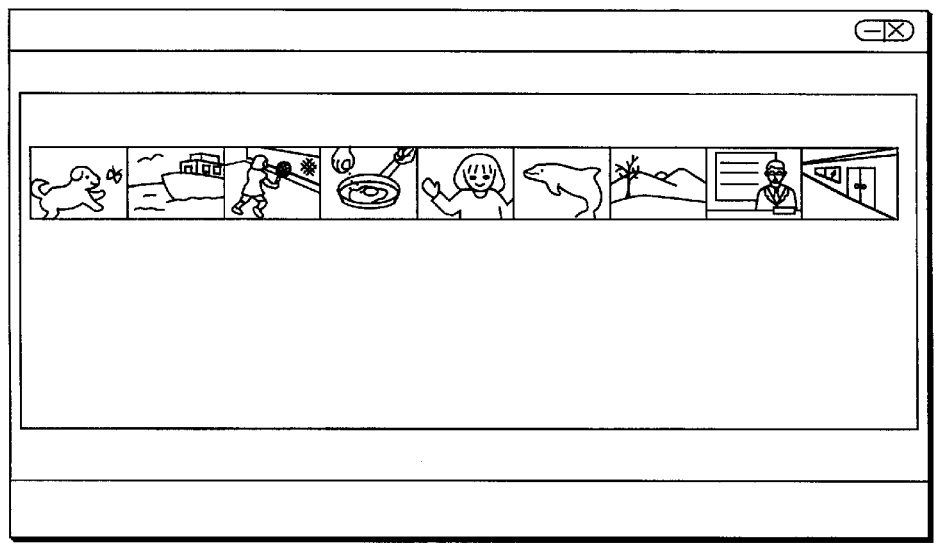
FIG. 25 is a diagram illustrating an example of how a list of index thumb nails is displayed in the embodiment.

As described above, each scene change is detected, and the detected picture is preserved in the hard disk 27 as index information to generate a thumb nail therefor. For a video file for which the picture indexes have been generated, information indicative of "IMAGE INDEX PRESENT" is preserved in its properties. The presence or absence of the produced picture index can be confirmed through a display "INDEX: PRESENT" by selecting a file on the displayed list of video files and clicking on a [PROPERTY] button. Also, when a [DISPLAY INDEX] button is clicked on this screen, a list of thumb nails is displayed as illustrated in FIG. 25.

Figure 26:
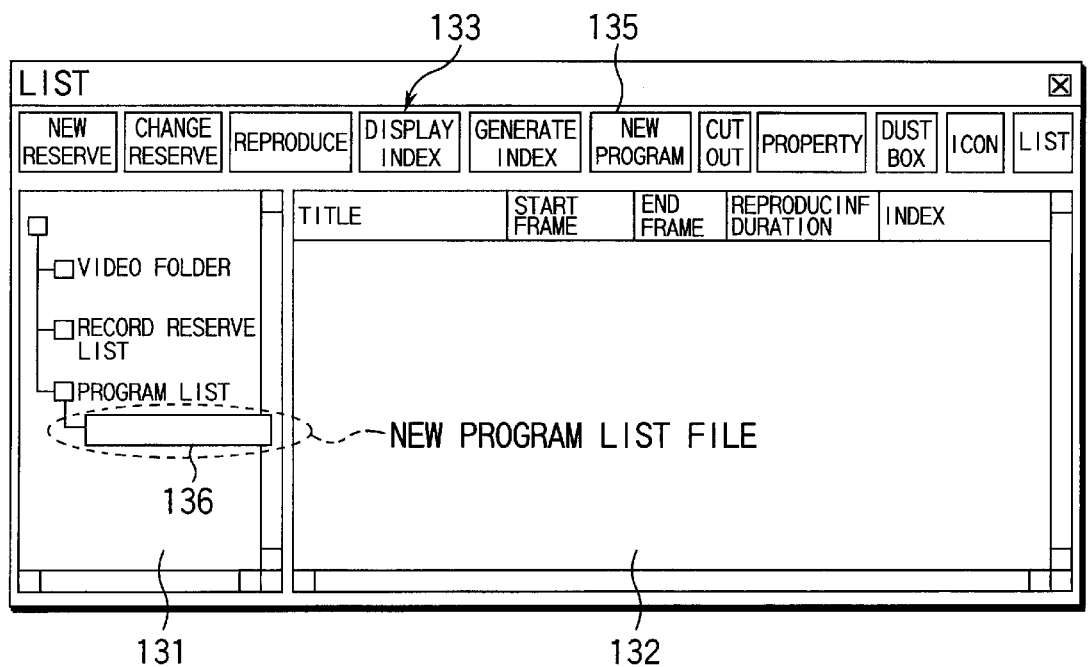
FIG. 26 is a diagram illustrating an example of a screen display for creating a new program list file in the embodiment.

Next, a program list file is created in the following procedure (step F2):

(1) AS [PROGRAM LIST] is selected in the tree view 131 and a new program creation button 135 is clicked on a list displayed on the screen illustrated in FIG. 26, a new program list 136 is created below "PROGRAM LIST."

Figure 27:
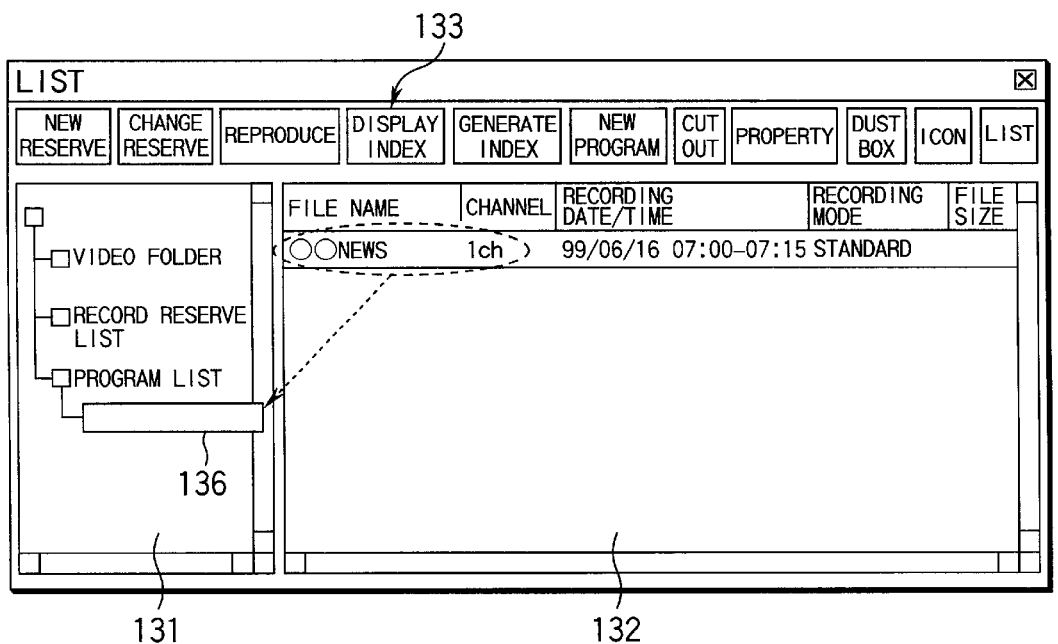
FIG. 27 is a diagram illustrating an example of a screen display for selecting an arbitrary file from a file list during creation of a program list file in the embodiment.

(2) A video folder in the tree view 131 is selected as illustrated in FIG. 27 to display a file list for selecting a desired file.

(3) The right button of the mouse is clicked on a program list icon in a program list to select "ADD PROGRAM LIST" from a pop-up menu.

Figure 28:
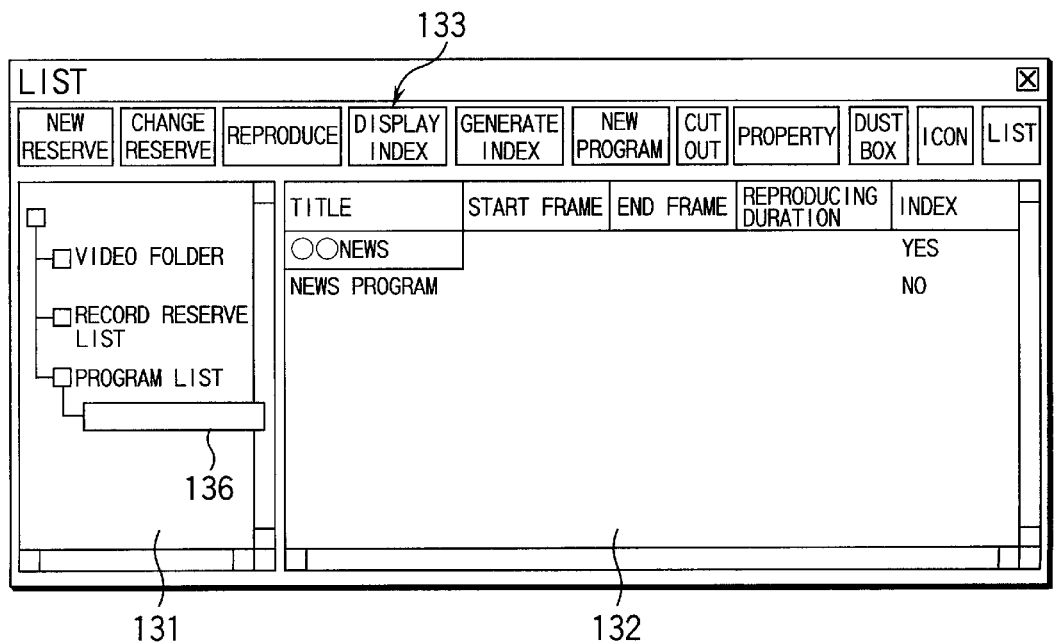
FIG. 28 is a diagram illustrating an example of a screen display when a list of video files making up a program list is displayed in a list view during the creation of the program list file in the embodiment.

(4) A new program list 136 is selected in the program list in the tree view 131 as illustrated in FIG. 28 to display a list of video files making up the program list in the list view 132.

Next, a video file to be reproduced is selected from the file list (step F3), and associated thumb nails (picture indexes) are displayed in the form of list as previously illustrated in FIG. 25 (step F4).

Next, referring to the thumb nails displayed as a list, reproduction start frame and end frame are selected for a thumb nail associated with a desired scene through clicking manipulations and the like (step F5). For example, the selected thumb nail may be surrounded by a frame or the like to indicate that the thumb nail has been selected. When the reproduction start frame and end frame are selected, the file name, start frame and end frame are additionally set in the program window list as illustrated in FIG. 29 (step F6).

After setting the reproduction start frame and end frame, it is determining whether or not the next file is selected (step F7). When selected, the flow returns to step F4 to repeatedly execute the foregoing processing.

Upon completing the processing for the target file, in other words, when a next file is not selected, the creation of the program list file is terminated (step F8).

FIGS. 30A and 30B show the file names 1, 2, 3 of selected files, and how the start frame numbers and the end frame numbers are set. As a [REPRODUCE] button is clicked, the files are reproduced in the order of the file names 1 ✱ 2 ✱ 3.

By generating thumb nails for a video file and displaying the generated thumb nails in the form of list to select arbitrary thumb nails to designate a range, a program list file can be readily created for a plurality of video files, and desired scenes can be reproduced in succession.

Power Supply Control for PC Card 3

Description will next be made on power supply control for the PCMCIA card 3. The PCMCIA card 3 and the digital video box 5 require the power capacities exceeding the maximum capacity of the power supplied from the personal computer 1, so that they are supplied with additional operating power from the external power source 34. When the PCMCIA card 3 is supplied with the operating power from the external power source 34 as described above, it is necessary to detect an operating state of the personal computer 1 and a supply state of the external power source 34, when the PCMCIA card 3 is connected to the personal computer 1, to properly supply the PCMCIA card 3 with the operating power in accordance with the respective states.

Figure 31:
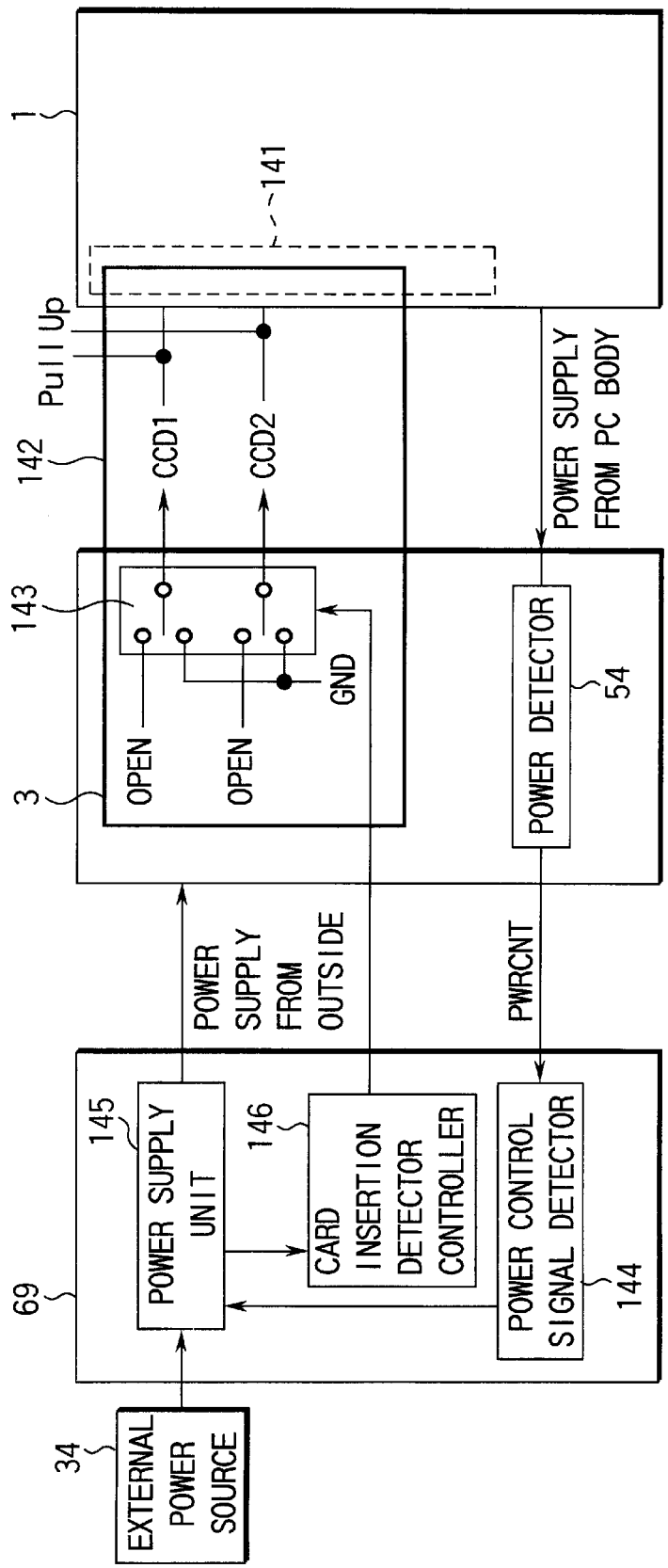
FIG. 31 is a block diagram illustrating an example of a system configuration for supplying a PCMCIA card with power from the outside in PCMCIA card power supply control according to the present invention.
Figure 32:
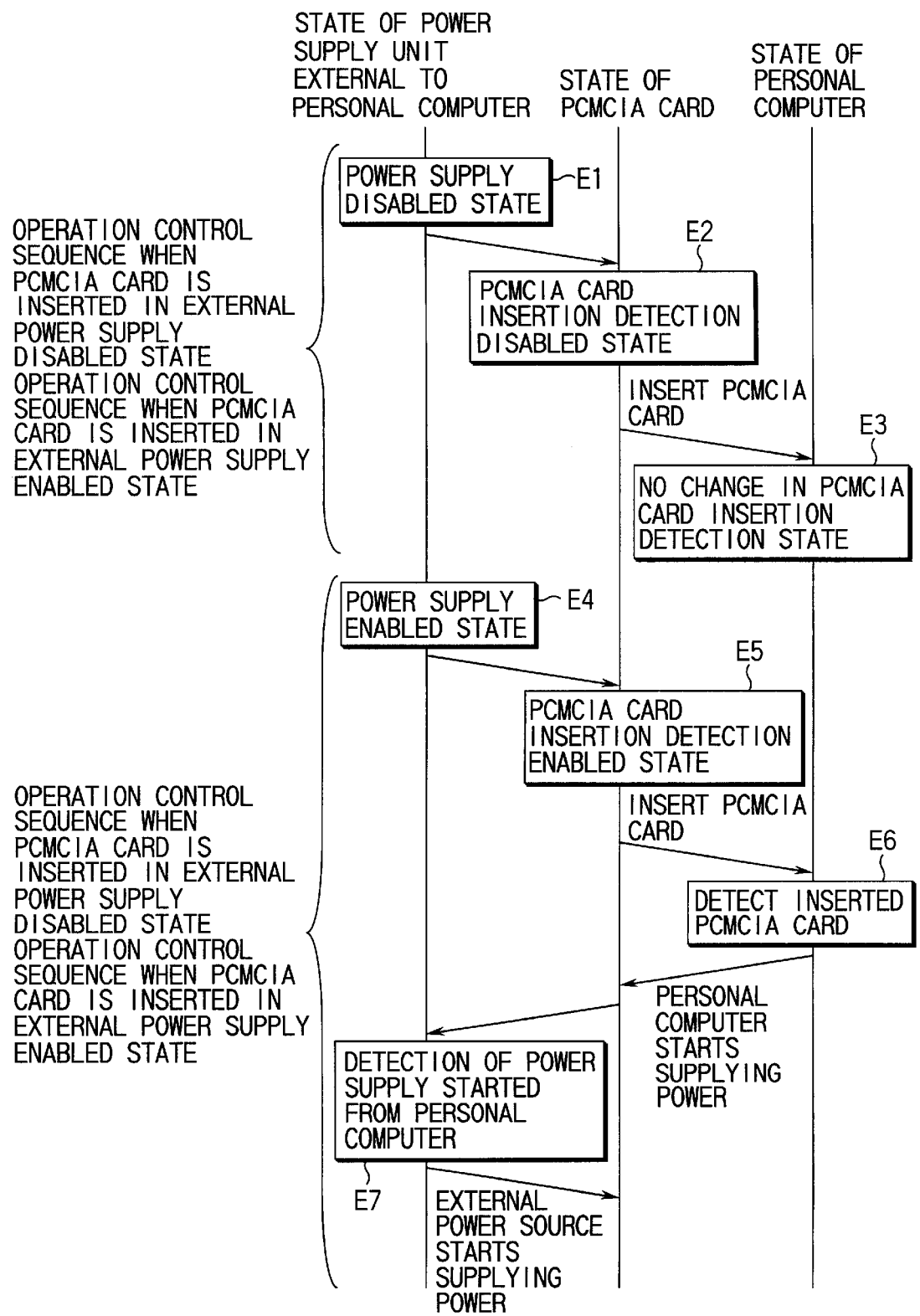
FIG. 32 is an operation control sequence illustrating a control procedure upon insertion of a PCMCIA card in the PCMCIA card power supply control in the embodiment.
Figure 33:
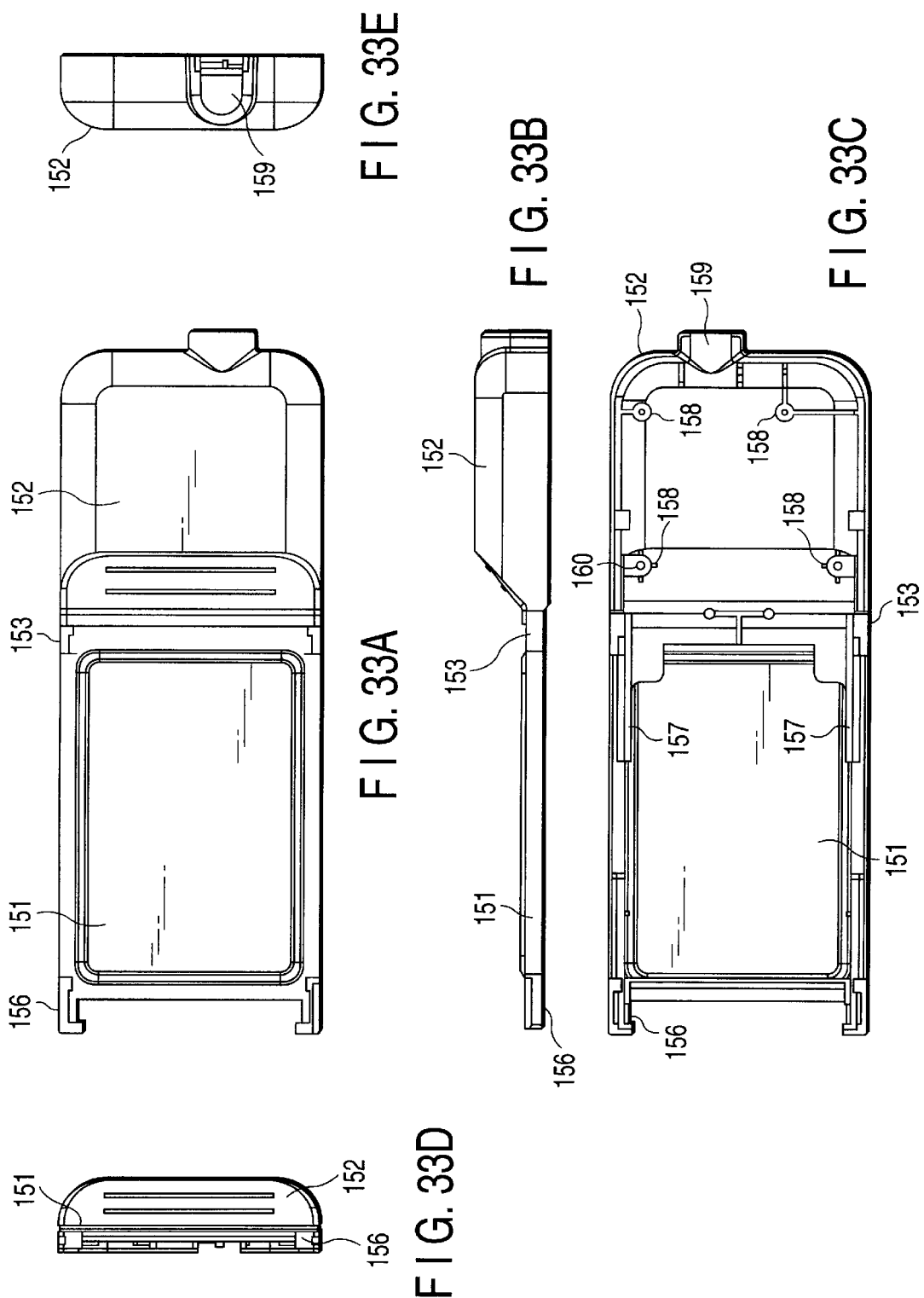
FIGS. 33A, 33B, 33C, 33D and 33E are a top plan view, a lateral view, a bottom view, a left side view and a right side view of a case unit for a PCMCIA card according to the present invention.

In the following, the power supply control for the PCMCIA card 3 will be described with reference to FIGS. 31 and 32. FIG. 31 is a block diagram illustrating an example of the system configuration when the PCMCIA card 3 is supplied with the power from the outside, and FIG. 32 is a diagram illustrating a power supply control procedure.

In FIG. 31, a socket unit 141 is a socket of the PCMCIA slot 2 arranged in the personal computer 1. A card insertion detector 142, which is a detector for detecting insertion of the PCMCIA card 3, is comprised of the socket unit 141 of the PCMCIA slot 2 and a switch circuit 143 disposed in the PCMCIA card 3. This switch circuit 143 has, for example, two circuit-two contacts for switching the contacts between the ground (GND) and open in response to a control signal sent from the power stabilizer 69, and outputs signals at that time to the socket unit 141 of the PCMCIA slot 2 as card insertion detecting signals CCD1 and CCD2. Pins of the socket 141, which receive the card insertion detecting signals CCD1 and CCD2, are pulled up. The PCMCIA card 3 is also provided with the power detector 54 for detecting a power supply state from the personal computer 1, as previously illustrated in FIG. 3. This power detector 54 outputs a "1" signal when the personal computer 1 is operating, in other words, when the PCMCIA card 3 is supplied with the power supply voltage from the power supply module 33, and a "0" signal when it is not supplied with the power supply voltage. The output signal of the power detector 54 is sent to the power stabilizer 69 in the digital video box 5 as a power control signal PWECNT.

The power stabilizer 69 comprises a power control signal detector 144 for detecting the power control signal PWRCNT; a power supply unit 145 for supplying the PCMCIA card 3 with the power from the external power source 34 in accordance with a detecting signal of the power control signal detector 144; and a card insertion detector controller 146 for controlling the card insertion detector 142 in accordance with a power supply enabled state of the power supply unit 145.

Next, the power control procedure in the foregoing system configuration will be described with reference to an operation control sequence illustrated in FIG. 32. In FIG. 32, steps E1–E3 show an operation control sequence which is performed when the PCMCIA card 3 is inserted into the PCMCIA slot 2 in a state where the power cannot be supplied from the outside, and steps E4–E7 show an operation control sequence which is performed when the PCMCIA card 3 is inserted into the PCMCIA slot 2 in a state where the power can be supplied from the outside.

First, description will be made on a procedure performed when the power cannot be supplied for some reasons such as the output of the external power source 34 or the power supply unit 145 being turned off. When the power cannot be supplied from the power supply unit 145 (step E1), the card insertion detector controller 146 outputs a control signal for opening the switch circuit 143 in the PCMCIA card 3. Upon receipt of the open control signal, the switch circuit 143 opens the card insertion detecting signals CCD1 and CCD2. In this event, therefore, the card insertion detector 142 is disabled (step E2). Even if the PCMCIA card 3 is inserted into the socket unit 141 of the personal computer 1 in this state, the pins of the sockets 141, which receive the card insertion detecting signals CCD1 and CCD2, are pulled up and held at High level since the card insertion detecting signals CCD1 and CCD2 are open, so that no change in state occurs, and accordingly insertion of a card is not detected (step E3).

Therefore, even if the PCMCIA card 3 is inserted into the PCMCIA slot 2 of the personal computer 1 in a state where the power cannot be supplied from the power supply unit 145, no power supply is started from the personal computer 1 to the PCMCIA card 3, so that the power supply from the external power source can be matched with the power supply from the personal computer 1. In this event, when an application or the like using the inserted PCMCIA card 3 is initiated in the personal computer 1, the application takes such measures as prompting the user to examine the state of the external power source.

Next, description will be made on a procedure performed when the power can be supplied from the power supply unit 145. When the power can be supplied from the power supply unit 145 (step E4), the card insertion detector controller 146 outputs a control signal indicative of a power supply enabled state to the switch circuit 143 of the PCMCIA card 3. Upon receipt of the control signal indicative of a power supply enabled state, the switch circuit 143 switches the card insertion detecting signals CCD1 and CCD2 to a ground state to enable the card insertion detector 142 (step E5). As the PCMCIA card 3 is inserted into the socket unit 141 of the personal computer 1 in this state, the pins of the socket unit 141, which receive the card insertion detecting signals CCD1 and CCD2, change to Low level. The personal computer 1 detects that the PCMCIA card 3 has been inserted from the change in the card insertion detecting signals CCD1 and CCD2 (step E6), and starts supplying the power to the PCMCIA card 3.

The power detector 54 disposed in the PCMCIA card 3 detects the power supplied from the personal computer 1 to the PCMCIA card 3 to raise the power control signal PWRCNT from the power stabilizer 69 to High level. The power stabilizer 69 detects the power control signal PWRCNT by the power control signal detector 144 (step E7), inputs the detecting signal to the power supply unit 145, and starts supplying the power from the power supply unit 145 to the PCMCIA card 3.

When the PCMCIA card 3 is inserted into the PCMCIA slot 2 in a state where the power can be supplied from the outside, the power supply is started from the personal computer 1 to the PCMCIA card 3, and the power from the external power source 34 is supplied to the PCMCIA card 3, thereby making it possible to match both of the supplied power.

Also, when the personal computer 1 or the PCMCIA card 3 is powered ON/OFF with the PCMCIA card 3 left inserted in the PCMCIA slot 2 of the personal computer 1 as described above, a similar operation to the foregoing can be performed to match the power supplies from the external power source 34 and the personal computer 1.

Structure of PC Card 3

Next, the structure of the PCMCIA card 3 will be described.

This PCMCIA card 3 is an extended type PCMCIA card which is comprised of a normal Type II PCMCIA card and an expansion unit added thereto, wherein the Type II unit is configured as before, and an external molding (case) in the expansion unit is newly fabricated, such that the two units are assembled. In addition, the coupling is reinforced to ensure a sufficient strength. The structure is described with reference to FIG. 33A to FIG. 35.

Figure 35:
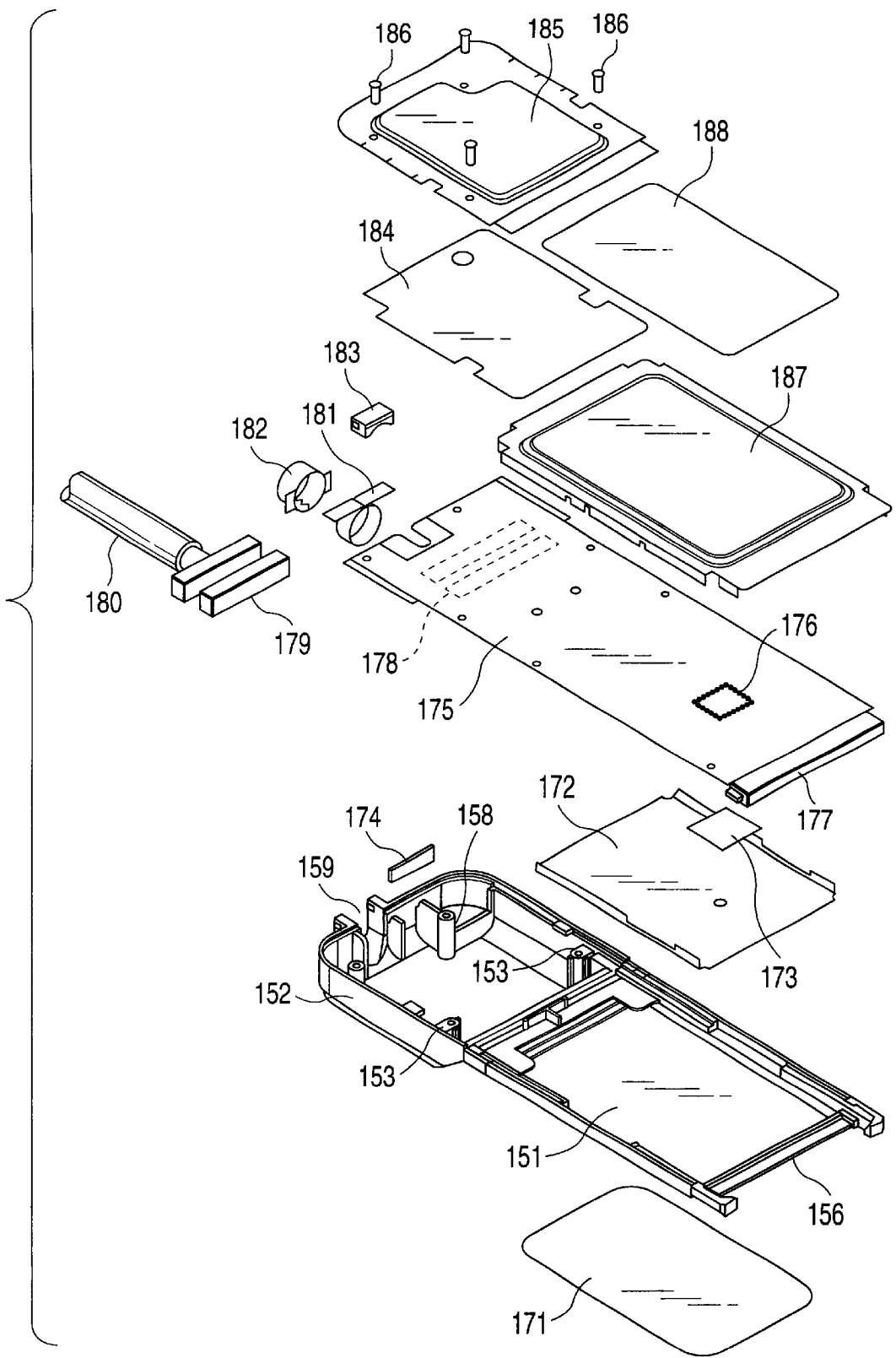
FIG. 35 is an exploded perspective view of the PCMCIA card in the embodiment, when viewed from the rear side.

FIGS. 33A to 33D illustrate a top plan view, a lateral view, a bottom view, a left side view and a right side view of the case of the PCMCIA card 3. FIG. 34 is a perspective view illustrating exploded cases for the Type II unit and the expansion unit of the PCMCIA card 3. FIG. 35 is an exploded perspective view of the PCMCIA card 3 viewed from the rear side.

In FIGS. 33A to 33D and FIG. 34, the PCMCIA card 3 comprises a front panel 151 corresponding to the Type II card unit; an extension case 152 corresponding to the card expansion unit; and a pair of metal-made brackets 153 for reinforcing the coupling of the front panel 151 and the extension case 152. The front panel 151 is formed of a metal plate, and the extension case 152 is formed by molding a resin.

The front panel 151 is formed with bent portions 154 on both sides and a coupling protrusion 155. Also, a connector holding member 156 made of a resin is attached to the front panel 151 on the side inserted to the PCMCIA slot 2 of the personal computer 1 illustrated in FIG. 2. This connector holding member 156 is attached making use of the bent portions 154 of the front panel 151 for holding a connector 177 (see FIG. 35) connected to the socket of the PCMCIA slot 2.

The extension case 152 is protrusively formed with a coupler 157 for coupling with the front panel 151. The coupler 157 is inserted into the bent portions 154 of the front panel 151, and coupled thereto making use of the coupling protrusion 155. Also, the extension case 152 is formed with columnar board mounting bases 158, for example, at four locations inside the extension case 152 as illustrated in FIG. 33C. The board mounting bases 158 are formed with screw holes for securing a circuit board or the like. Further, the extension case 152 is formed with a cable through-hole 159 on the side opposite to that coupled to the front panel 151.

The reinforcement brackets 153 are formed in the shape of crank, and formed with screw holes 160 at leading ends adjacent to the extension case 152. The bracket 153 have the leading end portions including the screw holes 160 into the extension case 152, and the other end portions inserted into the bent portions 154 of the front panel 151 to reinforce the coupling between the front panel 151 and the extension case 152. In this case, the brackets 153 inserted in the extension case 152 have the dimensions and the like which is appropriately set such that the screw holes 160 align with the screw holes of the board mounting bases 158.

In the card case constructed as described above, members such as a circuit board and the like are mounted as illustrated in FIG. 35. Specifically, a front label 171 is adhered to the outer surface of the front panel 151, for example, with a double-side adhesive tape, and a heat spreader 172 and a cool sheet 173 are disposed within the front panel 151. Also, a gasket 174 is adhered to the inside of the extension case 152 with a double-side adhesive tape for making an electric connection at a leading end, i.e., at a position close to the cable through-hole 159.

On the front panel 151 and the extension case 152, a circuit board 175 is disposed through the head spreader 172 and the cool sheet 173. The circuit board 175 has a size corresponding to the front panel 151 and the extension case 152, and formed with screw holes at positions corresponding to the board mounting bases 158. The circuit board 175 is mounted with circuit parts 176 and with a connector 177 on one end for connection to the personal computer 1. The connector 177 is held by the connector holding member 156 of the front panel 151.

The circuit board 175 is also provided with a connector 178 on the side opposite to the extension case 152. The connector 178 is connected to the digital video box 5 illustrated in FIGS. 1 and 2 through a connector 179 and a cable 180 (adaptor interface 4). The cable 180 passes through the cable through-hole 159 of the extension case 152, grounded to the circuit board 175 by an earth plate 181 near the connector 179, fixed by a clamp 182, and held in the cable through-hole 159 through a cable cover 183.

A press cover 185 is laminated on the circuit board 175 through an insulating cover 184 in an area corresponding to the extension case 152. Screws 186 are inserted through screw holes from the outside of the press cover 185, and screwed into the screw holes in the board mounting bases 158 of the extension case 152. Further, the circuit board 175 is mounted with a back panel 187 opposing the front panel 151. A back label 188 is adhered on the outer surface of the back panel 187 with a double-side adhesive tape.

As described above, in the extended type PCMCIA card 3 comprised of the normal Type II PCMCIA card and the expansion unit added thereto, conventional Type II members are used for the Type II unit, and an external extension case is newly fabricated for the expansion unit, such that they are assembled with their coupling reinforced by the bracket 153, thereby making it possible to reduce the cost and ensure a sufficient strength. Also, even for a particular type of PCMCIA card 3 having the expansion unit of a different size, only the expansion unit need be newly fabricated, thereby making it possible to readily support a variety of PCMCIA cards having different sizes, and to fabricate the PCMCIA cards at a lower cost.

While the foregoing embodiment has shown that a video picture is compressed in the PCMCIA card 3, it goes without saying that a video picture may be compressed in the digital video box 5 or in the personal computer 1.

Also, the foregoing embodiment has shown that the digital video box 5 and the personal computer 1 are connected through the PCMCIA card 3. Alternatively, information may be transmitted therebetween using, for example, radio communication units such as Bluetooth and infrared communications (IrDA), bus connection means such as IEEE1394, or connection units such as SCSI and USB (universal serial bus).

Also, while the foregoing embodiment has been described for the configuration in which the digital video box 5 is connected to the personal computer 1 through the PCMCIA card 3, the present invention may be similarly implemented in a configuration in which an audio/video I/O interface equipped with a television tuner is incorporated in the personal computer 1.

Also, while the foregoing embodiment has been focused on the recording and reproduction of a television video signal and audio signal, video signals input to the S video input terminal 11 and the RCA video input terminal 12, and audio signals input to the audio RCA input terminal (L) 15 and the audio RCA input terminal (R) 16 can also be recorded and reproduced in a similar manner. Further, a video signal and an audio signal captured in the personal computer 1 can also be monitored by a monitor device connected to the S video output terminal 13, RCA video output terminal 14, RCA output terminal (L) 17 and RCA output terminal (R) 18, and/or recorded by a video deck.

As described above in detail, according to the present invention, an audio/video I/O interface equipped with a television tuner is disposed in a personal computer, and audio/video signals input through the audio/video I/O interface are compressed in accordance with the MPEG2 specifications for recording in a large capacity storage device, or decompressed in accordance with the MPEG2 specifications for display, so that a television receiving function can be added even to a note type personal computer to view a television program thereon.

Also, the present invention provides a PCMCIA card or an audio/video I/O interface connected to a personal computer with MPEG2 encoder/decoder functions such that a television video signal input from the audio/video I/O interface is compressed in accordance with the MPEG2 specifications, while a television audio signal is sent to the personal computer without compressed. In a television audiovisual mode, the compressed video signal and the non-compressed audio signal are multiplexed with their timing being matched, and the two signals are separated and output to a display and a speaker, respectively. In a recording mode, the television audio signal is compressed and then multiplexed on the television video signal, with their timing being matched, and the multiplexed signal is recorded in the large capacity storage device. Therefore, the television program receiving, recording and reproducing functions can be readily added even to a note type personal computer at a later time.

Also, in the present invention, when a PCMCIA card inserted in an expansion slot of a personal computer is supplied with the power from an external power source in addition to the power supplied from the personal computer, the inserted PCMCIA card is detected before starting the power supply from the personal computer to the PCMCIA card, when the PCMCIA card inserted in the expansion slot can be supplied with the power from the external power source. On the PCMCIA card, the power supplied from the personal computer is detected to supply the PCMCIA card with the power from the external power source. It is therefore possible to match the power supply from the personal computer to the PCMCIA card with the power supply from the external power source to the PCMCIA card, to prevent the PCMCIA card from being uselessly supplied with the power, and to protect the PCMCIA card from damages. Specifically, when using a PCMCIA card which requires a power capacity exceeding the maximum capacity of the power supply from the personal computer to the PCMCIA card, the PCMCIA card can be supplied with the power external to the personal computer in a procedure compatible with a PCMCIA card insertion detecting procedure and a power supply sequence defined by the standards.

Further, in the present invention, an extended type PCMCIA card, which is an extended version of the PCMCIA Type II PCMCIA card, is provided with a front panel corresponding to a Type II card unit and a separate extension case for a card expansion unit, and the front panel and the extension case are coupled with a reinforcement provided by metal-made brackets. Therefore, even for a variety of PCMCIA cards having expansion units of different sizes, only the extension cases need be newly manufactured, while the case for the Type II card unit can be used in common, thereby making it possible to reduce the cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording and reproducing apparatus using a personal computer, comprising:
   a personal computer including an expansion slot; and
   a PCMCIA card inserted into said expansion slot of said personal computer and configured to send externally a video signal and an audio signal to said personal computer,
   wherein said personal computer includes a recording and reproducing unit configured to record and reproduce a signal input thereto through said PCMCIA card in and from a large capacity storage medium, a PCMCIA card detector configured to detect a mounting state of said PCMCIA card in said expansion slot, a recording reserve setting unit configured to set a recording reserve, and a reset unit configured to display a warning or cancel a recording reserve in response to said PCMCIA card detector detecting that said PCMCIA card has detached when said recording reserve has been set.

2. The recording and reproducing apparatus according to claim 1, wherein the PCMCIA card detector checks whether or not a recording start time is reached, and when the recording start time reached, it again checks the mounting state of the PCMCIA card.

3. The recording and reproducing apparatus according to claim 1, wherein the recording reserve setting unit displays a new reserve window to prepare again for reserve settings after displaying the warning.

4. The recording and reproducing apparatus according to claim 1, wherein the PCMCIA card compresses the video signal based on MPEG2 specifications without compressing the audio signal, and transmits the compressed video signal and the non-compressed audio signal to the personal computer.

5. The recording and reproducing apparatus according to claim 4, wherein the personal computer compresses the non-compressed audio signal in accordance with specifications of MPEG1 layer 2 and multiplexes the compressed video signal and audio signal in sync with each other and stores the multiplexed signal in the storage medium.

6. A recording and reproducing apparatus using a personal computer, comprising:
   a personal computer including an expansion slot; and
   a PCMCIA card inserted into said expansion slot of said personal computer and configured to send externally a video signal and an audio signal to said personal computer,
   wherein said personal computer includes a recording and reproducing unit configured to record and reproduce a signal input thereto through said PCMCIA card in and from a large capacity storage medium, a PCMCIA card detector configured to detect a mounting state of said PCMCIA card in said expansion slot, a recording reserve setting unit configured to set a recording reserve, and a reset unit configured to check whether or not said PCMCIA card is normally mounted by said PCMCIA card detector immediately before executing the reserved recording set by said recording reserve setting unit to display a warning and cancel the recording reserve when abnormal mounting of said PCMCIA card is detected.

7. The recording and reproducing apparatus according to claim 6, wherein the PCMCIA card detector checks whether or not a recording start time is reached, and when the recording start time is reached, it again checks the mounting state of the PCMCIA card.

8. The recording and reproducing apparatus according to claim 6, wherein the recording reserve setting unit displays a new reserve window to prepare again for reserve settings after displaying the warning.

9. The recording and reproducing apparatus according to claim 6, wherein the PCMCIA card compresses the video signal based on MPEG2 specifications without compressing the audio signal, and transmits the compressed video signal and the non-compressed audio signal to the personal computer.

10. The recording and reproducing apparatus according to claim 9, wherein the personal computer compresses the non-compressed audio signal in accordance with specifications of MPEG1 layer 2 and multiplexes the compressed video signal and audio signal in sync with each other and stores the multiplexed signal in the storage medium.

11. A recording and reproducing apparatus comprising:

a personal computer including an expansion slot and a storage; and a PCMCIA card inserted into the expansion slot of the personal computer and configured to send a video signal and an audio signal to the personal computer, wherein the personal computer includes means for recording and reproducing a signal input thereto through the PCMCIA card in and from the storage, means for detecting a mounting state of the PCMCIA card in the expansion slot, means for setting a recording reserve, and means for providing a warning or canceling a recording reserve in response to the detecting means detecting that the PCMCIA card has detached when the recording reserve has been set.

12. A recording and reproducing apparatus comprising:

a personal computer including an expansion slot and a storage; and a PCMCIA card inserted into the expansion slot of the personal computer and configured to send a video signal and an audio signal to the personal computer, wherein the personal computer includes means for recording and reproducing a signal input thereto through the PCMCIA card in and from the storage, means for detecting a mounting state of the PCMCIA card in the expansion slot, means for setting a recording reserve, means for checking whether or not the PCMCIA card is normally mounted in the expansion slot immediately before executing the reserved recording, means for canceling the recording reserve and providing a warning when the PCMCIA card fails to be mounted normally in the expansion slot.

* * * * *